United States Patent [19]

Hatori et al.

[11] 4,217,609
[45] Aug. 12, 1980

[54] ADAPTIVE PREDICTIVE CODING SYSTEM FOR TELEVISION SIGNALS

[75] Inventors: Yoshinori Hatori, Yokohama; Hideo Yamamoto, Sagamihara, both of Japan

[73] Assignee: Kokusai Denshin Denwa Kabushiki Kaisha, Tokyo, Japan

[21] Appl. No.: 15,668

[22] Filed: Feb. 27, 1979

[30] Foreign Application Priority Data

Feb. 28, 1978 [JP] Japan .................................. 53/21465

[51] Int. Cl.$^2$ .............................................. H04N 7/12
[52] U.S. Cl. .................................... 358/136; 358/138; 358/13; 364/515; 375/28
[58] Field of Search ............... 358/133, 135, 136, 138, 358/260, 261, 13; 325/38 B; 364/515; 340/347 DD; 179/15.55 R

[56] References Cited

U.S. PATENT DOCUMENTS

| 3,632,865 | 1/1972 | Haskell et al. | 358/136 |
|---|---|---|---|
| 3,715,483 | 2/1973 | Limb et al. | 358/135 |
| 3,761,613 | 9/1973 | Limb | 358/136 |
| 3,767,847 | 10/1973 | Haskell et al. | 358/136 |
| 4,060,834 | 11/1979 | Moumts et al. | 358/261 |
| 4,133,006 | 1/1979 | Iinuma | 358/136 |
| 4,141,034 | 2/1979 | Netravali et al. | 358/135 |
| 4,144,543 | 3/1979 | Koga | 358/136 |
| 4,144,547 | 3/1979 | Stoffel | 358/260 |

Primary Examiner—Robert L. Griffin
Assistant Examiner—Edward L. Coles
Attorney, Agent, or Firm—Robert E. Burns; Emmanuel J. Lobato; Bruce L. Adams

[57] ABSTRACT

A television signal coding system which achieves stable coding efficiency in both stationary and moving picture. This invention is directed to such a predictive coding system in which for predicting a first picture element in a certain field, use is made of sampled values of a second picture element lying next to the first picture element on the left on the same line and picture elements in the same field such as the third and fourth picture elements lying on the line second as counted upwardly from the line of the first picture element and sampled values of picture elements on the line immediately underlying the line of the first and second picture elements but in the previous field. In this invention, a comparison operation is made between restored values obtained by the intra-field predictive coding and the inter-field predictive coding, and one of coders which has provided a restored value closer to a true picture element value is adaptively used as an input signal coder. This makes it possible to utilize high coding efficiency by the inter-field coding in a case of a stationary picture and stable coding efficiency by the intra-field coding in a case of a moving picture.

2 Claims, 22 Drawing Figures

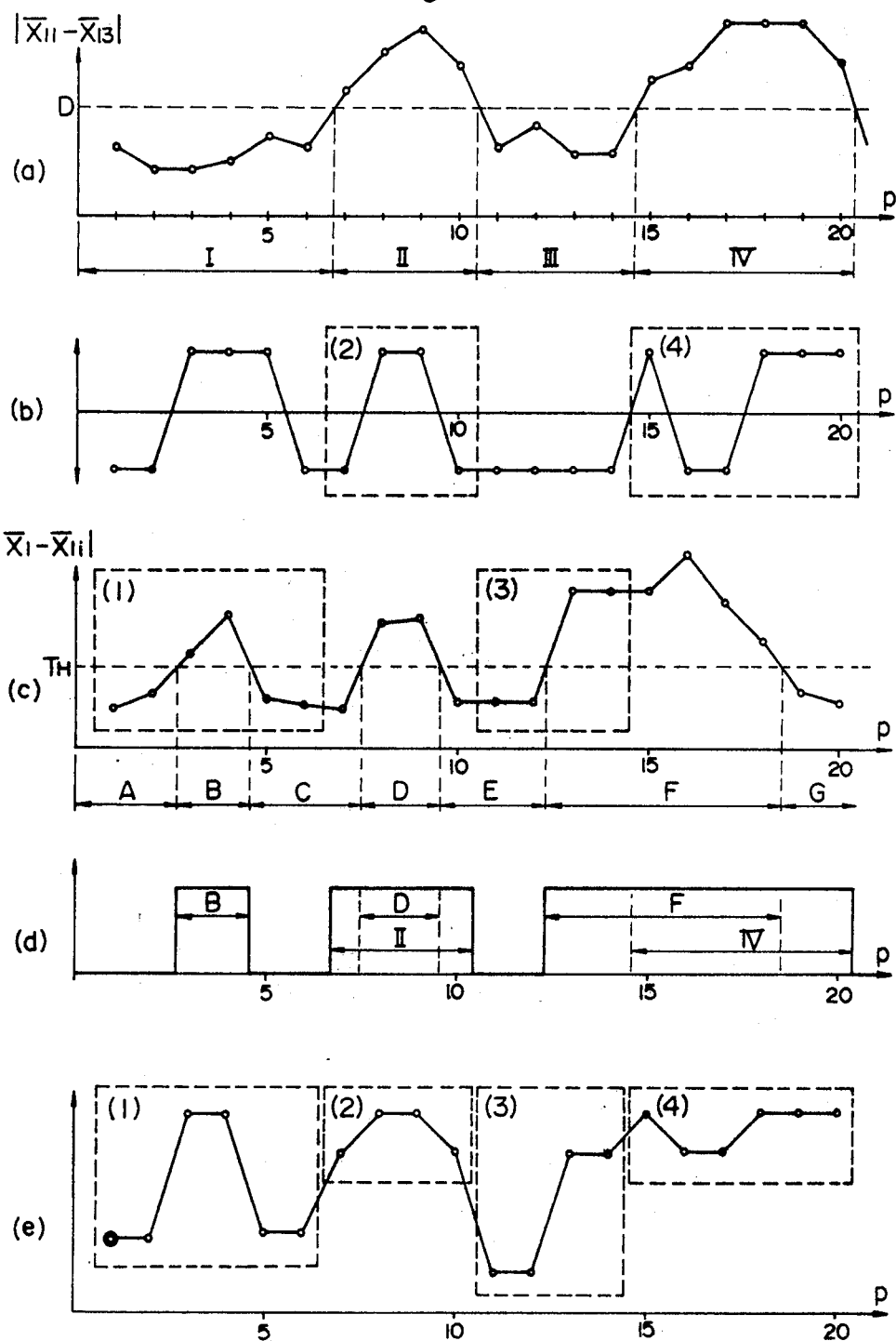

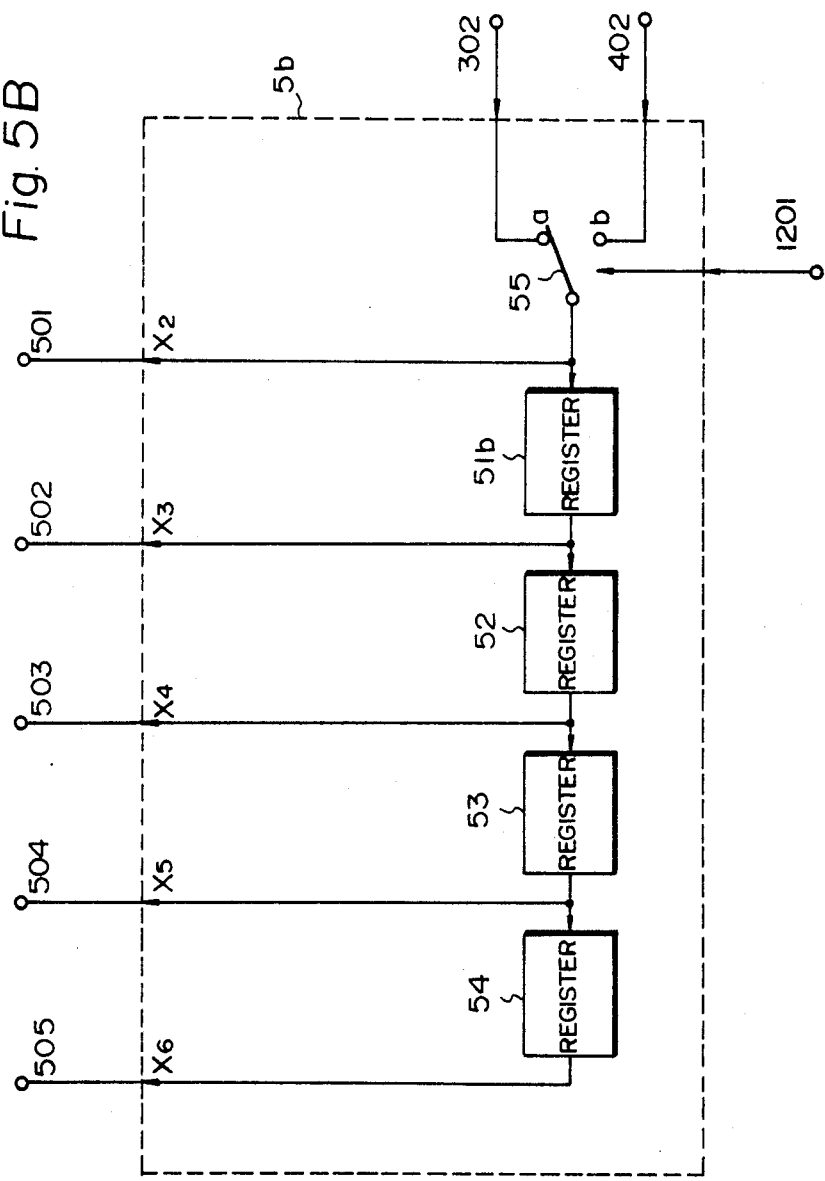

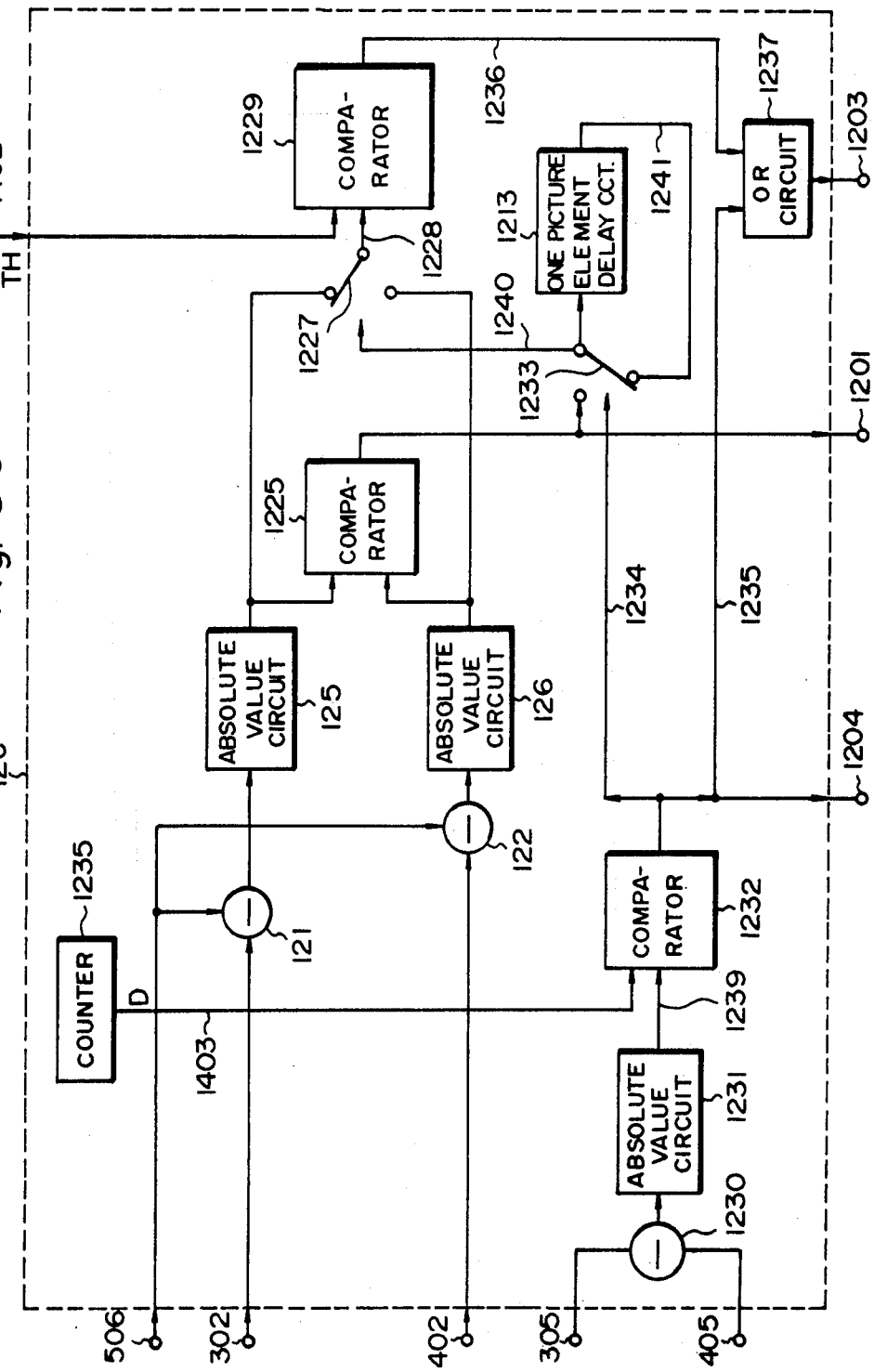

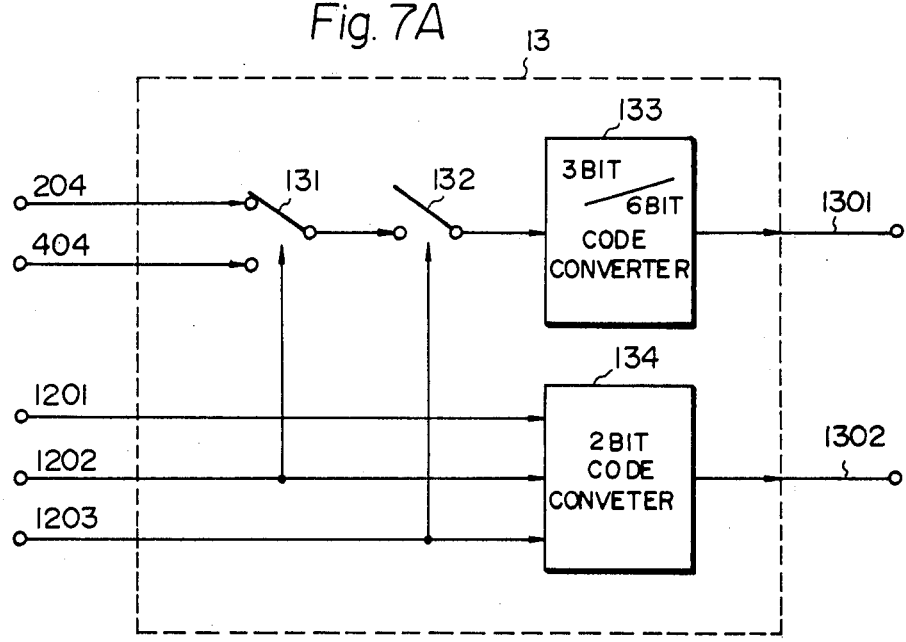
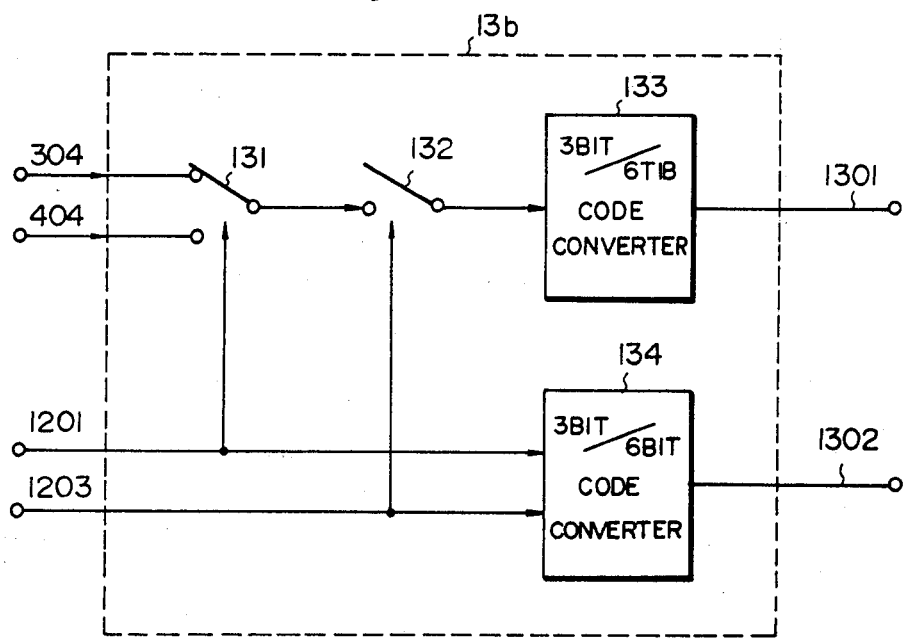

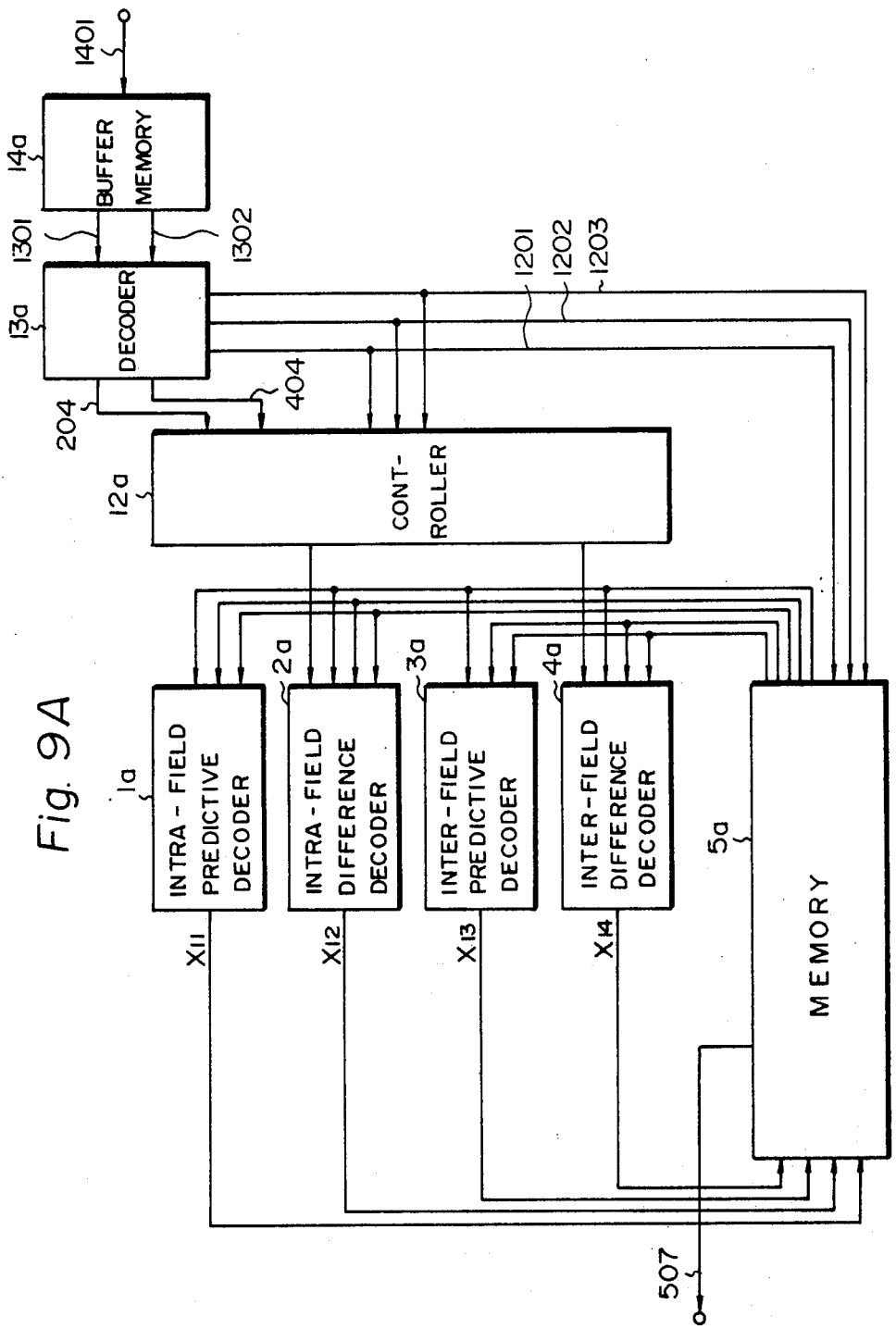

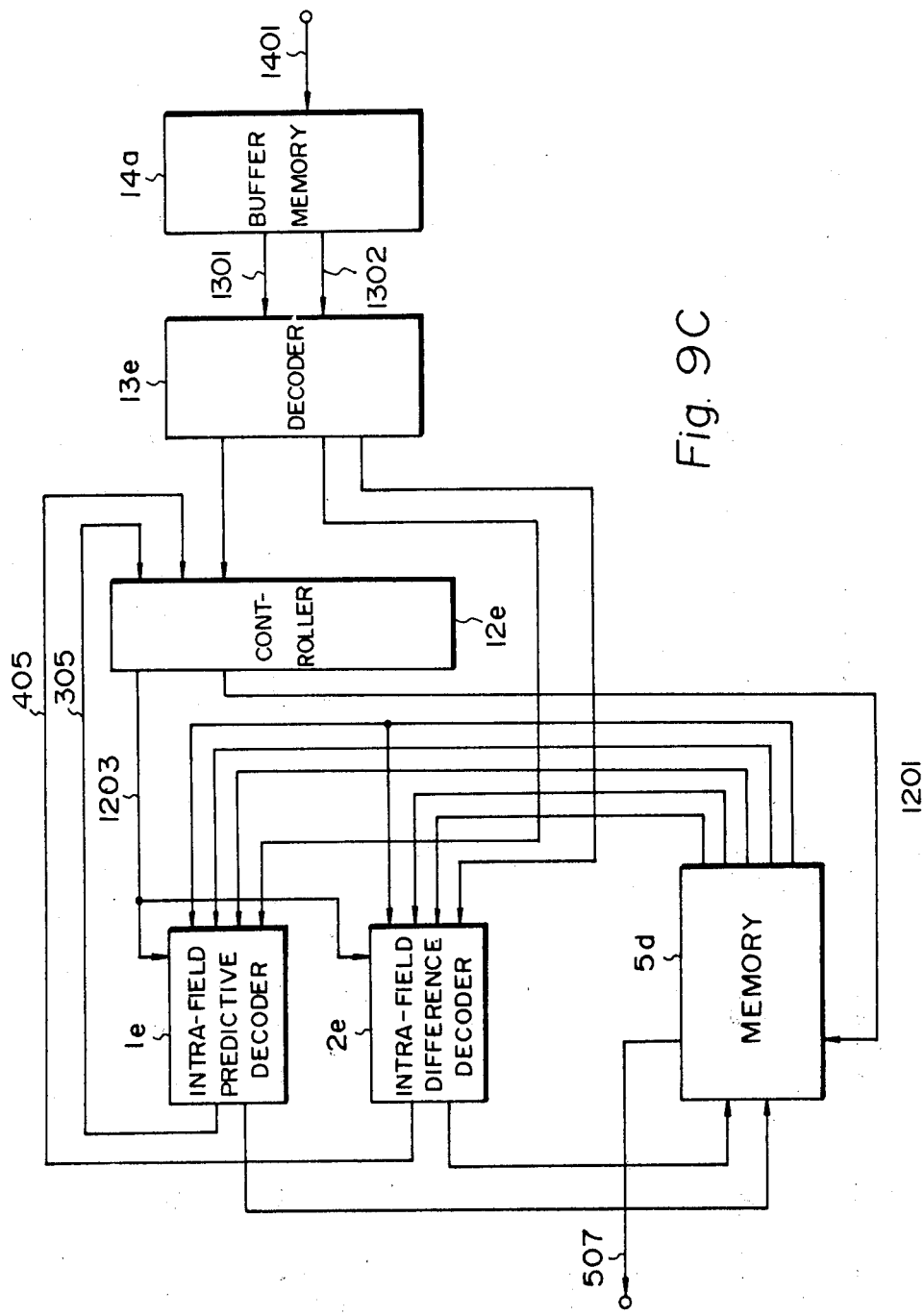

ADAPTIVE PREDICTIVE CODING SYSTEM FOR TELEVISION SIGNALS

BACKGROUND OF THE INVENTION

1. Field of the Invention

This invention relates to a predictive coding system which achieves highly efficient coding of video signals as of commercial television or video telephone by making use of high correlation between adjacent picture elements in a picture.

2. Description of the Prior Art

In existing standard television a picture consists of frames which are sent by steps of thirty per second, and in each frame, interlaced scanning takes place every other scanning line; therefore each frame is composed of two consecutive fields. The elements forming the picture are called "picture elements", but since digital processing is here taken into consideration, each extracted sample will hereinafter be referred to as a picture element. Accordingly, in this case, the position of each picture element in the picture is dependent upon the sampling frequency necessary for signal digitalization.

Conventional inter-field predictive coding systems and conventional intra-field predictive coding systems have the same merits but the former has a defect of lowered coding efficiency of a moving picture and the latter a defect of insufficient coding efficiency in a still picture; therefore it is impossible to realize a coding device which achieves constant high coding efficiency in both cases of moving and stationary pictures.

SUMMARY OF THE INVENTION

In view of the above, an object of this invention is to provide a television signal coding system which achieves stable coding efficiency in both stational and moving pictures.

BRIEF DESCRIPTION OF THE DRAWINGS

The principle of this invention will be clearly understood from the following detailed description taken in conjunction with the accompanying drawings, in which:

FIG. 1B shows diagrams explanatory of the adaptive coding system of this invention which indicates, by one bit for each picture element, whether the coding selected is the intra-field or inter-field predictive one and whether the difference quantization is selected or not;

FIG. 5B is a block diagram showing a specific operative example of the memory employed in the embodiment of FIG. 2B;

FIG. 6C is a block diagram illustrating a specific operative example of the controller utilized in the embodiment of FIG. 2C;

FIG. 7A is a block diagram illustrating a specific operative example of a transmission signal coder in the embodiment of FIG. 2A;

FIG. 7B is a diagram showing a specific operative example of the transmitted signal coder used in the embodiment of FIG. 2B;

FIG. 9A is a block diagram, corresponding to FIG. 2A, of the receiving side for decoding transmitted signals generated in accordance with this invention;

FIG. 9C is a block diagram os the receiving side, corresponding to FIG. 2C.

DETAILED DESCRIPTION

Figure 1A:
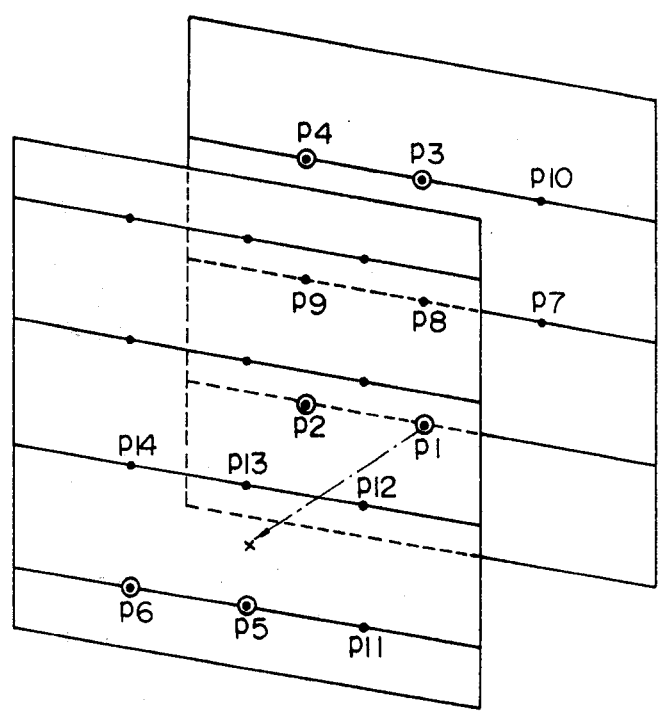
FIG. 1A is a diagram showing the positional relationships of picture elements explanatory of the predictive coding system of this invention.

To ready understand a difference between this invention and conventional system clear, a description will be first given of an example of a conventional coding system called an interfield predictive coding (refer to Japanese Patent Disclosure No. 102616/77). FIG. 1A shows the positional relationships of picture elements $P_1$, $P_2$, $P_3$, $P_4$, $P_5$ and $P_6$ in the coding. Since the sampling frequency is selected to be an integral multiple of a horizontal scanning frequency, the picture elements are arranged in the form of a lattice, and because of the interlaced scanning, scanning lines of a previous field are each disposed between corresponding adjacent scanning lines of an instant field. In this case, a picture element $P_2$ is on the same line as the picture element $P_1$ in the instant field, lying next to it on the left; picture elements $P_3$ and $P_4$ are on the second line as counted upwardly from the line of the picture elements $P_1$ and $P_2$ in the instant field, respectively lying right above them; and the picture elements $P_5$ and $P_6$ are on a line just under the line of the picture elements $P_1$ and $P_2$ in the previous field, respectively lying directly below them. At this time, it is considered that high correlation exists between sampled values of adjacent ones of neighboring picture elements. Accordingly, by producing a predictive value $\overline{X}_1$ of a sampled value $X_1$ of the picture element $P_1$ as follows:

$$\overline{X}_1 = \tfrac{1}{2}X_2 + X_5 - \tfrac{1}{2}X_6 \tag{1}$$

utilizing the sampled values of the adjoining picture elements and by quantizing and coding a predictive error $$O_x = X_1 - \overline{X}_1 \tag{2}$$

between the predictive value $\overline{X}_1$ and the true value $X_1$, so that it is possible to achieve highly efficient coding in which the number of transmission bits required may be small. This is the inter-field predictive coding heretofore employed. In the above the predictive value is described to be obtained by using the values of the picture elements $P_2$, $P_5$ and $P_6$, but an intra-field predictive coding is also possible in which the predictive value $\overline{X}_1$ is produced by making use of picture elements in the same field. Further, this conventional intra-field predictive coding (refer to Japanese Patent Disclosure No. 102616/77) is a system which achieves highly efficient coding by providing the following predictive value $\overline{X}_1$ of the picture element $P_1$:

$$\overline{X}_1 = \tfrac{1}{2}X_2 + X_3 - \tfrac{1}{2}X_4 \tag{3}$$

utilizing the sampled values of the picture elements $P_3$ and $P_4$ lying on the second line as counted upwardly from the picture element $P_2$ in the same field in FIG. 1A and by the difference quantization of the difference between the predictive value and the true one, as is the case with the inter-field predictive coding. Also in the inter-field coding, it is possible to achieve a method which utilizes other picture elements of the previous field, as is the case with the intra-field coding.

With the inter-field predictive coding, in a case of a still picture the picture element sampled values $X_1$, $X_2$ and $X_5$, $X_6$ correspond to those of the adjoining picture elements in the picture, and their correlation is high to provide for enhanced efficiency in coding; but in a case of a moving picture the correlation between the picture elements $P_1$, $P_2$ and $P_5$, $P_6$ becomes lower in correspondence to their shifting in the picture in one field period (1/30 sec.), resulting in lowered coding efficiency. With the intra-field predictive coding method, the coding efficiency of a still picture is not so high as in the case of the inter-field coding, but also in a moving picture, the positional relationships in the picture corresponding to the picture elements $P_1$, $P_2$ and $P_3$, $P_4$ remain unchanged, and further, resolution power of the picture is degraded by the storage effect of a television camera, so that the correlation between the picture elements is raised by that and the coding efficiency can be expected to rise a little.

That is, this invention is directed to such a predictive coding system in which for predicting, for example, the picture element $P_1$ in a certain field shown in FIG. 1A, use is made of sampled values of the picture element $P_2$ lying next to the picture element $P_1$ on the left on the same line and picture elements in the same field such as the two picture elements $P_3$ and $P_4$ lying on the second line as counted upwardly from the line of the picture element $P_1$ and sampled values of picture elements on the line immediately underlying the line of the picture elements $P_1$ and $P_2$ but in the previous field, for example, the picture elements $P_5$ and $P_6$. In this invention, a comparison is made between restored valued obtained by the intra-field and the inter-field predictive coding operations and that one of coders which has provided a restored value closer to a true picture element value is used as an input signal coder. This makes it possible to utilize high coding efficiency by the inter-field coding in a case of a stationary picture and stable coding efficiency by the intra-field coding in a case of a moving picture. In this invention, a sampling frequency $f_{SP}$ is selected to be an integral multiple of the half of a horizontal scanning frequency $f_H$ as follows:

$$f_{sp} = \tfrac{n}{2} f_H \tag{4}$$

(where n is an integer, for example, $n = 1365$). Where n is even, sample points are arranged lengthwise, and where n is odd, the sample points shifts by $\tfrac{1}{2}$ sample point spacing upon each occurrence of scanning. The alternative is one called the PALE system in which even if n is odd, so that the sample points are displaced by half phase for each horizontal scanning, thereby arranging the sample points lengthwise.

Next, a description will be given of the predictive coder in this invention being effective, in respect of an example of the intra-field predictive coding. In the intra-field coder, the predictive value $\overline{X}_1$ of the current picture element value $X_1$ is produced as follows:

$$\overline{X}_1 = \tfrac{1}{2}X_2 + X_3 - \tfrac{1}{2}X_4 \tag{5}$$

by utilizing picture element values $X_2$, $X_3$ and $X_4$ in the same field. Now, the following will describe that the above predicting equation is effective for a composite color signal of the NTSC system. An NTSC color television signal in a standard television system takes the form of a composite signal composed of three signal components derived from three primary color output signals of a camera, i.e. a luminance signal Y representing brightness and two chrominance signals I and Q. Accordingly, the picture element value $X_1$ of the NTSC signal can be given as follows:

$$X_1 = Y_1 + I_1 \cos\alpha + Q_1 \sin\alpha \tag{6}$$

(where the phase $\alpha = 2\pi \cdot f_{sc} \cdot t + 33°$, $f_{sc}$ being an NTSC color subcarrier frequency). Further, as the color subcarrier is displaced by half in phase relative to the horizontal scanning frequency for each line, the value $X_3$ of the picture element $P_3$ lying on the second line as counted upwardly from the line of the picture element $P_1$ is displaced by one phase as follows:

$$X_3 = Y_3 + I_3 \cos\alpha + W_3 \sin\alpha \tag{7}$$

The values of the picture elements $P_2$ and $P_4$ respectively lying on the same lines as the picture elements $P_1$ and $P_3$ and next to them on the left are expressed as follows:

$$X_2 = Y_2 + I_2 \cos(\alpha - \Delta\alpha) + Q_2 \sin(\alpha - \Delta\alpha) \tag{8}$$

$$X_4 = Y_4 + I_4 \cos(\alpha - \Delta\alpha) + Q_4 \sin(\alpha - \Delta\alpha) \tag{9}$$

(where $\Delta\alpha = 2\pi \cdot f_{sp} \cdot \Delta t$, $$\Delta t = \frac{1}{fsp}$$

and fsp being a sampling frequency). Accordingly, a predictive error $O_1$ between a true picture element value and the predictive value is as follows:

$$O_1 = X_1 - \overline{X_1} \qquad (10)$$

$$= \{Y_1 + I_1\cos\alpha + Q_1\sin\alpha\}$$

$$- \tfrac{1}{2}\{Y_2 + I_2\cos(\alpha - \Delta\alpha) + Q_2\sin(\alpha - \Delta\alpha)\}$$

$$- \{Y_3 + I_3\cos\alpha + Q_3\sin\alpha\}$$

$$+ \tfrac{1}{2}\{Y_4 + I_4\cos(\alpha - \Delta\alpha) + Q_4\sin(\alpha - \Delta\alpha)\}$$

$$= \{Y_1 - \tfrac{1}{2}Y_2 - Y_3 + \tfrac{1}{2}Y_4\}$$

$$+ (I_1 - I_3)\cos\alpha + (Q_1 - Q_3)\sin\alpha$$

$$- \tfrac{1}{2}(I_2 - I_4)\cos(\alpha - \Delta\alpha) - \tfrac{1}{2}(Q_2 - Q_4)\sin(\alpha - \Delta\alpha)$$

The first term put in the brace is equivalent to a predictive error relative to a monochrome signal, and as the values of $Y_1$ to $Y_4$ are close to one another, the value of the first term, as a whole, is close to zero. Further, in the second term et the seq., since the chrominance component is generally narrow in frequency band and since high correlation is considered to exist between adjoining picture elements, it follows that $$I_1 - I_3 \doteq 0 \qquad (11)$$

$$Q_1 - Q_3 \doteq 0 \qquad (12)$$

$$I_2 - I_4 \doteq 0 \qquad (13)$$

$$Q_2 - Q_4 \doteq 0 \qquad (14)$$

Since these are multiplied by a sine or cosine value less than 1 in absolute value, it is considered that they are also close to zero. Accordingly, the predictive error, as a whole, is also close to zero. In an intra-field difference quantizing coder the predictive error $O_1$ between the predictive value $\overline{X_1}$ and the true value $X_1$ is thus calculated and then quantized as follows:

$$Z_1 = X_1 - \overline{X_1} + \Delta O_1 \qquad (15)$$

(where $\Delta O_1$ is a quantization error), and the quantized value $Z_1$ is sent out to a transmission line. Accordingly, when the value of the predictive error is close to zero in the equation (10), the number of bits necessary for representing the difference signal may be small, making it possible to effect highly efficient coding for an NTSC decoded signal.

On the receiving side, restored values $X_2'$, $X_3'$ and $X_4'$ of the picture elements $P_2$, $P_3$ and $P_4$ restored until then are used to obtain a predictive value of $X_1$ as follows:

$$\overline{X_1}' = \tfrac{1}{2}X_2' + X_3' - \tfrac{1}{2}X_4' \qquad (16)$$

By using this and the difference quantized value $Z_1$ received from the transmission line, the following restored value $X_1'$ of $X_1$ is provided:

$$X_1' = \overline{X_1}' + Z_1 \qquad (17)$$

-continued $$= \overline{X_1}' + X_1 - \overline{X_1} + \Delta O_1$$

$$= X_1 + (\overline{X_1}' - \overline{X_1}) + \Delta O_1$$

thus restoring the television signal.

The restored values $X_1'$ to $X_4'$ at the receiving side are respectively close to the picture element values $X_1$ to $X_4$ but strictly speaking, differ a little. Accordingly, there is the possibility that an error occurring between the predictive values $\overline{X_1}$ and $\overline{X_1}'$ at the transmitting and the receiving sides is accumulated to degrade the picture quality. To avoid this, the restored values $X_1'$ to $X_4'$ at the receiving side are also produced at the transmitting side and, on the basis of them, the predictive value $\overline{X_1}'$ is produced. Accordingly, strictly speaking, the equation (5) is expressed as the equation (16), while the equations (10), (15) and (17) are respectively expressed as follows:

$$O_{12} = X_1 - \overline{X_1}' \qquad (18)$$

$$Z_{12} = X_1 - \overline{X_1}' + \Delta O_{12} \qquad (19)$$

$$X_1' = X_1 + \Delta O_{12} \qquad (20)$$

In the following description, however, the suffixes indicating the restored values are omitted, for the sake of simplicity, except in particular cases where such omission would be a hindrance to correct understanding of the invention. It is the intra-field difference quantizing coder employed in this invention that produces a predictive value by the equation (16) and obtains a restored value by the operation of the equations (18) to (20) on the basis of the predictive value thereby to achieve high efficiency coding. By the high efficiency coding of the coder, the number of transmission bits per block of eight picture elements, for example, is reduced as follows: Assuming that an input signal is one having nine bits per picture element, if no high efficiency coding takes place, the number of transmission bits required is $9 \times 8 = 72$ bits/block. On the other hand, the value transmitted as a result of the difference quantizing and coding operation is only the difference quantized value given by the equation (19) and this is represented by a signal of about 3.2 bits/picture element, having a small error amplitude of 3 bits and a large error amplitude of 6 bits, so that the transmission bits needed is $3.2 \times 8 = 25.6$ bits/block. Thus, high efficiency coding is achieved by the coder.

The difference quantizing coder produces a predictive value (equation (16)), effects the difference quantization of a predictive error (equation (19)) and, by using it, obtains a restored value (equation (20). However, in such a portion in which the prediction is often fulfilled, for example, a flat wall-like portion, the difference quantized predictive error takes a value substantially equal to zero in many cases.

Accordingly, in such a case, even if the difference quantized value is decoded as zero at both of the transmitting and the receiving sides without being transmitted to the latter, an error between a true signal value and its restored value does not become so large. Therefore, the restored value is given as follows:

$$X_1' = \overline{X_1}' \qquad (21)$$

In the following, this coding will hereinafter be referred to as the "predictive coding" in distinction from the aforesaid difference quantizing and coding. In general, the difference quantizing and coding is also regarded as a kind of predictive coding. The restored value $X_1'$ (equation (21)) in this case and the restored value $X_1'$ (equation (20)) obtained by the difference quantizing and coding are different from each other. To make a distinction between the both values, the restored value by the intra-field predictive coding will hereinafter be represented by $X_{11}$ given as follows:

$$X_{11} = \overline{X_1'} \tag{22}$$

and the restored value by the intra-field difference quantizing and coding will be represented by $X_{12}$ given as follows:

$$X_{12} = \overline{X_1'} + (X_1 - \overline{X_1'} + \Delta O_{12}) = X_1 + \Delta O_{12} \tag{23}$$

Consequently, the predictive value $X_1'$ from the restored signal in the equation (23) and the predictive value in the equation (23) respectively indicate the following:

Equation (22)→$\overline{X_1'} = \tfrac{3}{8}X_{21} + X_{31} - \tfrac{3}{8}X_{41} = \overline{X_{11}}$ (24)

Equation (22)→$\overline{X_1'} = \tfrac{3}{8}X_{22} + X_{32} - \tfrac{3}{8}X_{42} = \overline{X_{12}}$ (25)

To distinguish them, the predictive values of the equations (24) and (25) will hereinafter be represented by $\overline{X_{11}}$ and $\overline{X_{12}}$, respectively.

As described above, in the intra-field predictive coding, a TV signal can be restored only by sending to the receiving side a bit indicating the use of the coding, so that very high coding efficiency can be achieved.

Now, letting P represent the probability of the use of, for example, the predictive coding, and hence a value $(1-P)$ represent the probability of the use of the difference a quantization, a value b represent the number of bits necessary for information indicating the coding and 3.2 represent the mean number of bits for the difference quantization, the number of transmission bits required is given as follows:

$$P \cdot b + (1-P)(b+3.2) = b + (1-P) \times 3.2 \tag{26}$$

For example, assuming that eight picture elements from one block, that an indication of the coding used for each block is sent by a bit and that ($b=\tfrac{1}{8}$), and assuming that P=0.15, the number of bits needed for restoring the eight picture elements is about 22.8 bits/block, which is less than the number of bits, 25.6 bits/block, in the aforementioned case of only the quantization. This means that a higher coding efficiency can be obtained.

The intra-field predictive coder and the inter-field difference quantizing coder employed in this invention are exactly equivalent to the abovesaid intra-field predictive coder and the abovesaid difference quantizing coder except in the case of the values of the picture elements $P_5$ and $P_6$ in place of those $P_3$ and $P_4$ in FIG. 1A for obtaining the predictive value. Accordingly, the predictive value $\overline{X_{13}}$ and the restored value $X_{13}$ in the inter-field predictive coder are respectively given as follows:

$$\overline{X_{13}} = \tfrac{3}{8}X_{23} + X_{53} - \tfrac{3}{8}X_{63} \tag{27}$$

$$X_{13} = \overline{X_{13}} \tag{28}$$

Similarly, the predictive value, the quantized value and the restored value in the inter-field difference quantizer part are respectively given as follows:

$$\overline{X_{14}} = \tfrac{3}{8}X_{24} + X_{54} - \tfrac{3}{8}X_{64} \tag{29}$$

$$Z_{14} = X_1 - \overline{X_{14}} + \Delta O_{14} \tag{30}$$

$$X_{14} = X_1 + \Delta O_{14} \tag{31}$$

Generally, with the inter-field prediction (equations (27) and (29)), in a case of a stationary picture, prediction is fulfilled with high probability but, in a case of a moving picture, prediction is not fulfilled. In terms of the number of bits required in the difference quantizing and coding, the difference value can be sent with about 3.05 bits on average in the case of the stationary picture, whereas in the case of the moving picture a larger number of transmission bits, such as 3.5 to 4.0 bits, is required. Therefore, the inter-field predictive coding has a defect such that high coding efficiency cannot be achieved. With the intra-field coding, there is no extreme change in the coding efficiency between a still stationary picture and a moving picture, but only a coding efficiency of, for example, about 3.2 bits on average can be obtained at all times. Then, if the predictive value is produced by one of the inter-field predictive coding and the intra-field predictive coding which is higher than the other in the probability of prediction being fulfilled, that is, if the inter-field coding and the intra-field coding are used, for example, for stationary picture and a moving picture, respectively, a high coding efficiency can be obtained as a whole. Assuming that the mean number of bits necessary for the difference quantization is 3.1 and that a signal indicating whether the inter-field coding or the intra-field coding is used is one bit, the number of transmission bits required is obtained from the equation (26) as follows:

$$a + b + (1-P) \times 3.1 \tag{32}$$

Assuming, for instance, that one block has eight picture elements, that it is indicated whether the intra-field coding or the inter-field coding is used and whether the predictive coding or the difference quantization is used ($a=\tfrac{1}{8}$, $b=\tfrac{1}{8}$) and that P=0.2 since the predictive coding is likely to be selected in correspondence to the probability of its prediction being fulfilled, the number of bits necessary for transmitting one block (eight picture elements) is about 21.8 bits/block. Accordingly, it is seen that the combination of the intra-field coding and the inter-field coding provides a coding system which exhibits high coding efficiency in both cases of stationary and moving pictures.

As is also indicated by the equation (32), the coding efficiency rises with a decrease in the number of bits (a+b) for indicating whether the intra-field coding or the inter-field coding is effected and whether the difference quantization is achieved. What will be described hereunder is a control part for reducing the number of transmission bits, which is one of the features of this invention.

It is determined in the following manner whether to use the intra-field coding or the inter-field coding and whether to use the predictive coding or the difference quantization coding. At first, in the intra- and inter-field predictive codings, the absolute values of differences between restored values and true ones and added by one block of eight picture elements and predictive block errors are produced as follows:

$$BO_1 = \sum_{i=1}^{8} |X_i - X_{i1}| \quad (33)$$

$$BO_3 = \sum_{i=1}^{8} |X_i - X_{i3}| \quad (34)$$

Then, the both values are compared with each other and the predictive coding of the smaller predictive block error is selected as a coding method of the predictive coder. Next, if the inter-field coding is selected, the block error $BO_3$ of the selected coding is compared with a predetermined threshold value $T_H$ and if $$BO_3 < T_H \quad (35)$$

the predictive coding is employed, and if $$BO_3 \geq T_H \quad (36)$$

the difference quantization is effected. Further, it is considered to employ such a method in which in the case of the difference quantizing and coding, use is made of the difference quantization selected in correspondence to the selected predictive coding; for example, if the inter-field predictive coding is selected, use is made of the inter-field difference quantization corresponding thereto. In this example, however, to obtain a higher coding efficiency, the block errors between restored values and the true ones in the intra- and inter-field quantizing and coding are provided as follows:

$$BO_2 = \sum_{i=1}^{8} |X_i - X_{i2}| \quad (37)$$

$$BO_4 = \sum_{i=1}^{8} |X_i - X_{i4}| \quad (38)$$

and the both values are compared with each other to select the coding of the smaller predictive block error as the coding method of the difference quantizing coder. Once the coding method to be used for each block is thus determined, the restored picture element value of the selected coding method, for example, $X_i (i=1 \sim 8)$ is stored in a memory for subsequent predictive value production. Accordingly, $X_{31}$, $X_{41}$ and $X_{32}$, $X_{42}$ and $X_{53}$, $X_{63}$ and $X_{54}$, $X_{64}$ in the equations (24), (25), (27) and (29) are of the same value.

The above method requires the restored values $X_{i1}$, $X_{i2}$, $X_{i3}$ and $X_{i4}$ in the intra-field and inter-field predictive coding and the difference quantization; therefore four kinds of coding devices must be prepared for obtaining the four kinds of restored values at all times. On top of that, it is necessary to select the coding method to be used and perform coding by the selected method in a time interval between the application of the last picture element of the instant block, for example, an eighth picture element and the application of a first picture element of the next block. Accordingly, this method requires circuit elements of high operating speed and introduces complexity in the construction of the coding device. If use is made of another controller by which this invention is also characterized, it is possible to avoid the abovesaid defects by determining the use of the intra-field or interfield predictive coding and the presence or absence of the difference quantization without using the restored values, as follows: In the intra-field prediction (equation (24)) and the inter-field prediction (equation (27)), the following predictive values $\overline{tX_{11}}$ and $\overline{tX_{13}}$ are produced by using a true picture element value $X_2$ of an input signal in place of the restored values $X_{21}$ and $X_{23}$ of immediately preceding picture elements on the same line:

$$\overline{tX_{11}} = \tfrac{1}{2}X_2 + X_{31} - \tfrac{1}{2}X_{41} \quad (24\text{-a})$$

$$\overline{tX_{13}} = \tfrac{1}{2}X_2 + X_{53} - \tfrac{1}{2}X_{63} \quad (27\text{-a})$$

The absolute values of differences between the predictive values $\overline{tX_{11}}$ and $\overline{tX_{13}}$ and the true picture element value are added, for example, by one block of eight picture elements, by which predictive block error values based on the true value are obtained as follows:

$$tBO_1 = \sum_{i=1}^{8} |X_i - \overline{tX_{i1}}| \quad (33\text{-a})$$

$$tBO_3 = \sum_{i=1}^{8} |X_i - \overline{tX_{i3}}| \quad (34\text{-a})$$

These two predictive block error values are compared with each other in magnitude so that the coding method of the smaller error is selected as the coding method of the coding part. Next, the block error value $tBO_3$ of the selected coding method, for example, if the inter-field coding is selected, is compared with a predetermined threshold value $T_H$, and if $$tBO_3 < T_H \quad (35\text{-a})$$

the predictive coding is employed, and if $$tBO_3 \geq T_H \quad (36\text{-a})$$

the difference quantization is employed.

This method does not employ the restored values $X_{21}$ and $X_{23}$ of the picture element $P_2$ next to that $P_1$ on the left for selecting the coding method, so that decision of the coding method and coding need not be effected at the same time. Therefore, coding can be effected after it is selected which one of the coding methods for each block. This eliminates the necessity of high-speed circuit elements for making a decision in a short time as is required in the abovesaid method. Since it is sufficient only to produce one of the restored values of the intra-field and inter-field predictive coding methods and the coding method including and excluding the difference quantization for each block, circuit elements common to the respective coding methods can be made common by which the coding device can be simplified in construction. As this method does not decide the magnitude of each coded restored value, the error value after coded is a little larger than in the case of the aforementioned method, resulting in more degraded picture quality.

In the above method, input picture elements are divided into blocks and the intra-field or inter-field prediction and the inclusion or exclusion of the difference quantization are indicated for each block. Accordingly, it is sufficient only to send the indication bit indicating the selected coding method once for each block; therefore the indication bits a and b per picture element shown by the equation (32) may be small in number. Assuming, for example, that use is made of one bit for indicating the intra-field or inter-field coding and one bit for indicating the inclusion or exclusion of the difference quantization and that eight picture elements forms one block, the number of bits a indicating the predictive coding is ⅛ bit per picture element and the number of bits b indicating whether the difference quantization has been effected or not is ⅛ bit. Further, if sixteen picture elements form one block, a=1/16 bit and b=1/16 bit; namely the number of transmission bits necessary for each picture element is further reduced. In practice, however, if the number of picture elements per block is thus increased, the picture quality is markedly degraded by using all picture elements of one block for either one of the predictive coding.

Conversely, if the block size is reduced to 1, a suitable predictive function and the inclusion or exclusion of the difference quantization can be decided for each picture element, so that the picture quality can be enhanced greatly. In this case, however, a=1 bit and b=1 bit and it is necessary to send two bits for each picture element. Therefore, it is proper that each block includes about eight picture elements. But if it is possible to send one bit per picture element for indicating both the intra-field or inter-field coding and whether the difference quantization has been effected or not, the picture quality can be improved without increasing so much the number of indication transmission bits. A description will be made of an example of another controller employing such a method by which this invention is characterized.

At first, a comparison is made between the intra-field predictive value $\overline{X_{11}}$ (equation (24)) and the inter-field predictive value $\overline{X_{13}}$ (equation (27)). In a case where the difference between these values is larger than a threshold value D predetermined between the transmitting and the receiving side $$|\overline{X_{11}}-\overline{X_{13}}| \geq D \qquad (38\text{-A})$$

use is made of the coding that one of the different between the restored value by the intra-field or the inter-field predictive coding and the true picture element value, $|X_1-X_{11}|$ or $|X_1-X_{13}|$, is smaller than the other, and information indicating the use of the selected coding is transmitted. Further, in this case, the difference equatization is always achieved.

If this difference is smaller than the threshold value $$|\overline{X_{11}}-\overline{X_{13}}| < D \qquad (38\text{-B})$$

since it is considered that it makes no great difference whether the intra-field or inter-field predictive coding is selected, use is made of the predictive coding employed for predicting the immediately preceding picture element. At this time, the signal indicating whether the difference quatization is effected or not is transmitted. For example, where the intra-field predictive coding was selected for the immediately preceding picture element, the intra-field predictive coding is used for the current picture element and, by the indication of the transmission signal, the inter-field difference quantizing and coding, for example, is selected. Since the intra-field predictive value $\overline{X_{11}}$ and the inter-field predictive value $\overline{X_{13}}$ can also be obtained on the receiving side, information indicating the difference between $|\overline{X_{11}}-\overline{X_{13}}|$ and the threshold value D is not sent to the receiving side.

The above relationships will be described in detail with reference to FIG. 1B. Let it be assumed that first to twentieth picture element signals are applied and that the difference, $|\overline{X_{11}}-\overline{X_{13}}|$, is larger than the threshold value D in the ranges from the seventh to tenth picture elements (region II) and from the fifteenth to twentieth picture elements (region IV), as shown in (a) of FIG. 1B. Assuming that a small one of the differences between the restored values of the intra-field and inter-field predictive coding and the true picture element value is selected as the predictive function for the picture element, the intra-field and inter-field predictive coding are selected, as shown in (b) of FIG. 1B. Further, let it be assumed that the difference between the restored value $X_{1i}$ based on the predictive value by the selected predictive coding and the true value, $|X_1-X_{1i}|$, exceeds the threshold value $T_H$ in regions B, D and F shown in (c) of FIG. 1B. At this time, in the regions I and III information (1) and (3) indicating whether the difference quantization is effected or not are sent, while in the regions II and IV information (2) and (4) indicating whether the selected coding is the intra-field or inter-field predictive one are sent. Moreover, the difference value for achieving the difference quantization is sent in each of regions B, II and F+IV of the third to fourth, seventh to tenth and thirteenth to twentieth picture elements. In this case, at the receiving side, the intra-field predictive coding takes place if the intra-field predictive coding is always selected for a first picture element of each line; and by signals subsequently transmitted, the intra-field or inter-field predictive coding and coding of the presence or absence of the difference quantization are selected.

The above has described three methods for the control part which selects the intra-field and the inter-field predictive coding and the presence or absence of the difference quantization.

Generally, when a picture pattern to be coded is fine, the rate of selecting the difference quantizing coder increases and, in this csase, the rate of difference quantization of an error amplitude of six bits, which is large in the difference quantization, increases, resulting in increased mean number of bits. On the other hand, since the speed of signals sent out to the transmission line must be constant, difference quantized signals to be sent out to the transmission line are once stored in a buffer memory and then sent out to the transmission line at a constant speed. To perform this, the threshold value $T_H$ is changed in accordance with the amount of signals stored in the buffer memory, by which the rate of selection of the difference quantizing coder or the predictive coder is changed, ensuring to generate transmission signals at a constant rate as a whole.

In the foregoing description, the equations (24) and (27) are used as predictive functions in this invention but may be replaced by other functions such, for example, as shown in Table 1 using the picture elements $P_2$ to $P_{14}$ in FIG. 1A.

Table 1

Intra-field predictive function
$\overline{X_1} = X_2 + X_3 - X_4$
$\overline{X_1} = \tfrac{1}{2}X_2 - \tfrac{1}{2}X_8 + \tfrac{1}{2}X_9 + \tfrac{1}{2}X_3 - \tfrac{1}{2}X_4$
$\overline{X_1} = 6/8X_2 + \tfrac{1}{2}X_7 + \tfrac{1}{2}X_9 - \tfrac{1}{2}X_{10} + 6/8X_3 - \tfrac{1}{2}X_4$
$\overline{X_1} = \tfrac{1}{2}X_2 + 2/8X_7 + \tfrac{1}{2}X_8 - \tfrac{1}{2}\tfrac{1}{2}10 + 4/8X_3 - \tfrac{1}{2}X_4$
Intra-field predictive function
$\overline{X_1} = X_2 + X_5 - X_6$
$\overline{X_1} = \tfrac{1}{2}X_2 - \tfrac{1}{2}X_{13} + \tfrac{1}{2}X_{14} + \tfrac{1}{2}X_5 - \tfrac{1}{2}X_6$
$\overline{X_1} = (X_{11} + 6X_5 + X_6 + X_{12} - 2X_{13} + X_{14})/8$ The above is the principle of the high efficiency TV signal coding based on the adaptive predictive coding in which the gist of this invention resides.

Next, a description will be made with regard to a specific operative example of the high efficiency coding system employing the adaptive predictive coding of this invention.

Figure 2A:
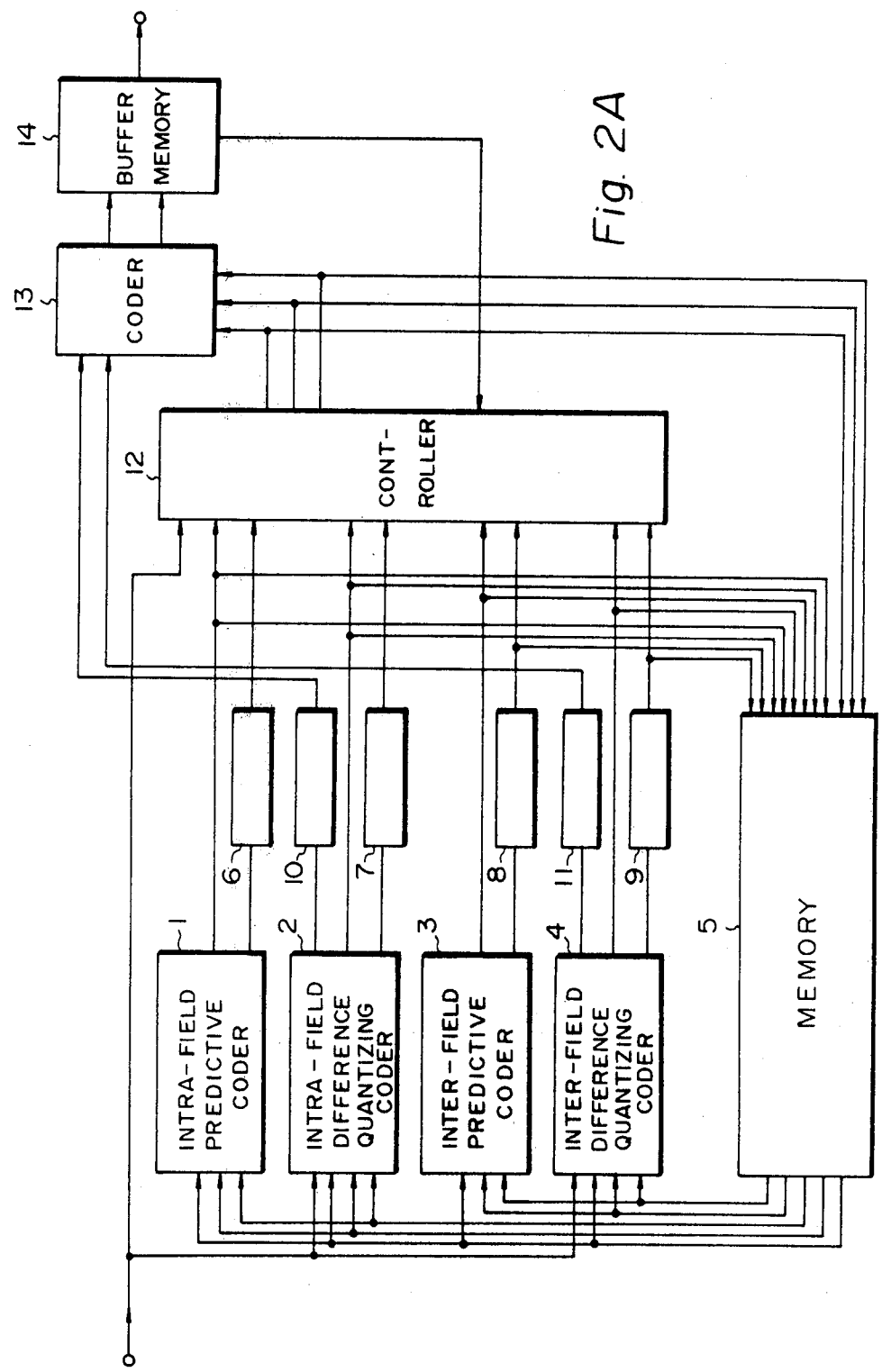
FIG. 2A is a block diagram, illustrating an embodiment of the predictive coding system of this invention.

FIG. 2A shows in a block form the adaptive predictive coding system employing the picture element values explained previously in connection with FIG. 1A. Reference numeral 1 indicates an intra-field predictive coder; 2 designates an intra-field difference quantizing coder; 3 identifies an inter-field predictive coder; 4 denotes an inter-field difference quantizing code; 5 represents a memory capable of storing television signals of substantially one field; 6, 7, 8 and 9 show auxiliary memories capable of storing restored values of television signals of eight picture elements; 10 and 11 refer to auxiliary memories capable of storing differential signal values of eight picture elements; 12 indicates a controller for selecting a suitable one of the four coders from the intra-field predictive coding to the inter-field difference quantizing and coding for each block; 13 designates a coder for rendering a difference quantized value into a variable length code and adding thereto a signal indicating the coder selected by the controller 12; and 14 identifies a buffer memory for sending out transmission signals to a transmission line at a constant rate.

Figure 3A:
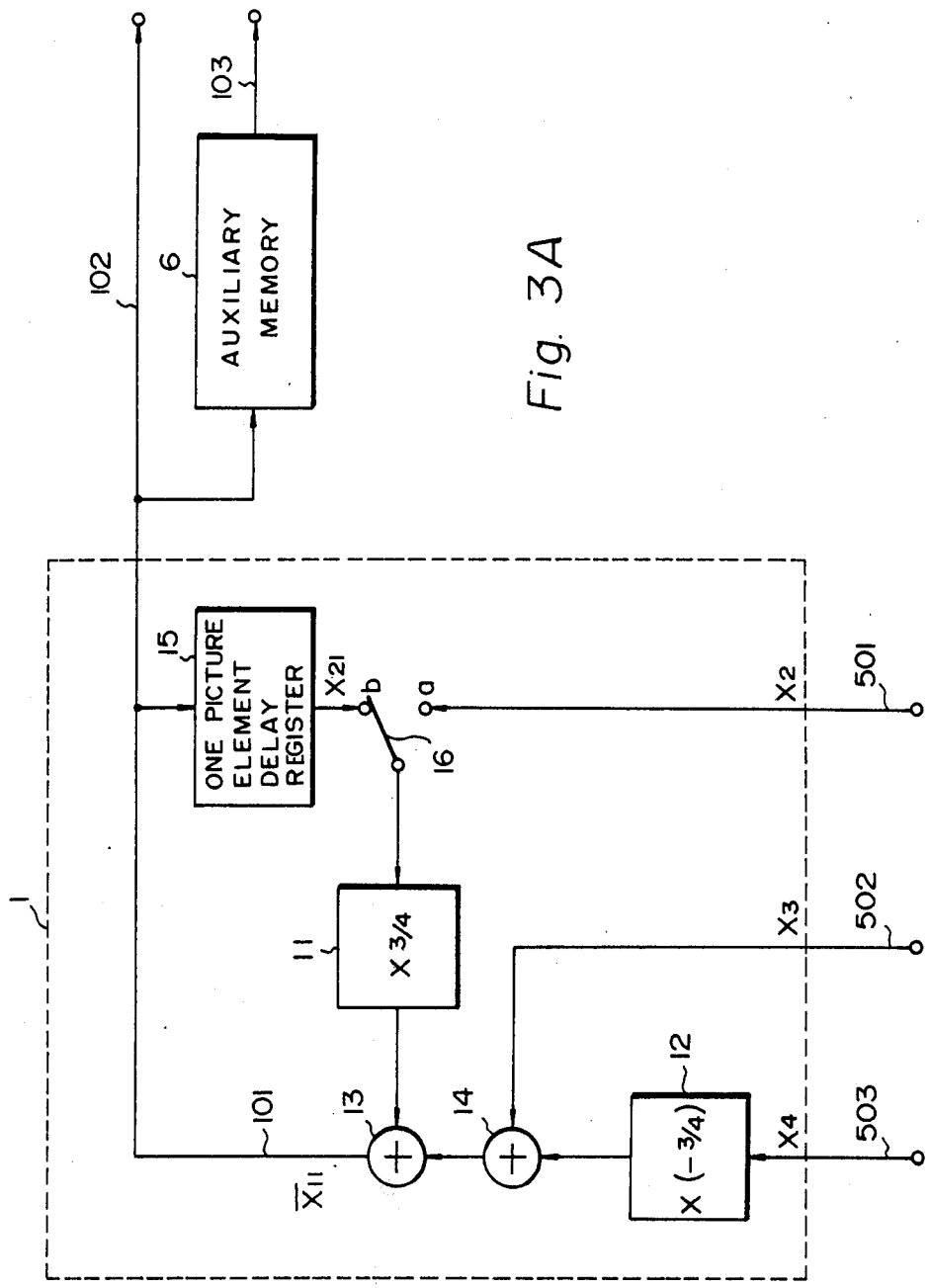
FIG. 3A is a block diagram showing a specific operative example of an intra-field predictive coder in the embodiment of FIG. 2A.

In the above, the parts 1 to 4 are coders by which this invention is characterized. Their details will be described in respect of FIGS. 3A and 4A. FIG. 3A illustrates the intra-field predictive coder. In FIG. 3A, reference numerals 501, 502 and 503 respectively indicate restored values $X_2$, $X_3$ and $X_4$ of the picture elements $P_2$, $P_3$ and $P_4$, which are supplied from the memory 5; 11 and 12 designate coefficient calculators which respectively effect multiplications of $\frac{3}{4}$ and $-\frac{3}{4}$ by means of a shift register, an adder and a subtractor; and 13 and 14 identify adders, by which a predictive value $\overline{X_{11}}$ of the latest picture element is produced as follows:

$$\overline{X_{11}} = \tfrac{3}{4}X_2 + X_3 - \tfrac{3}{4}X_4 \tag{39}$$

Reference numeral 15 denotes a register which provides a delay of one picture element, so that there is yielded after this delay circuit 15 a restored value $X_{21}$ of an immediately preceding picture element restored by the selected predictive coder. A switch 16 is provided for selecting either one of $X_2$ and $X_{21}$ as a restored value. In a case of one block being composed of eight picture elements, the switch 16 is connected to the side a for a first one of the picture elements and to the side b for the other remaining picture elements.

The picture element value thus produced is sent to the controller 12, as indicated by 102, and, at the same time, stored in the auxiliary memory part 6 for eight picture elements.

Figure 4A:
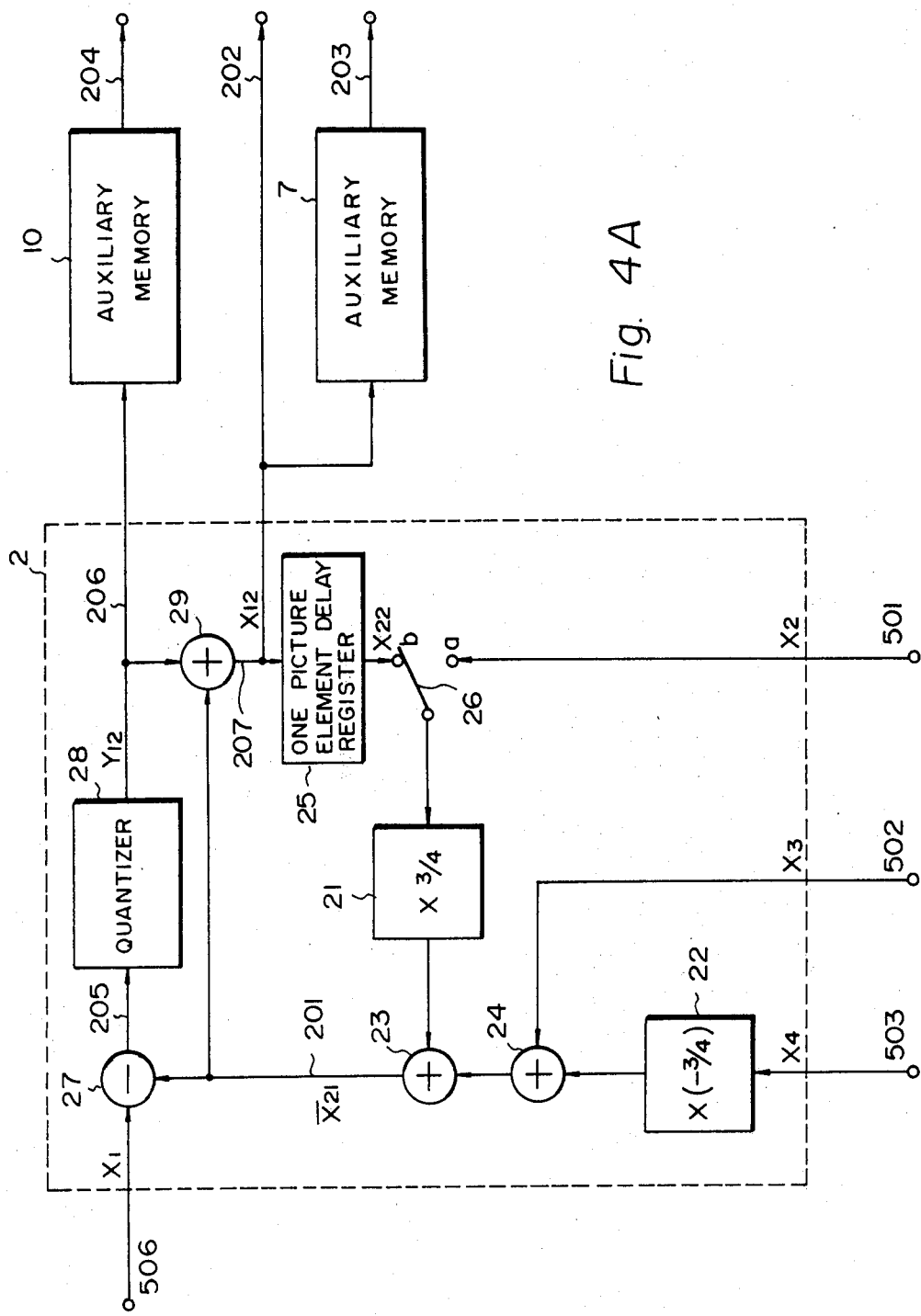
FIG. 4A is a block diagram illustrating a specific operative example of an intra-field difference quantizing coder in the embodiment of FIG. 2A.

FIG. 4A is explanatory of the principle for realizing the intra-field difference quantizing coder 2. In FIG. 4A, reference numerals 501 to 503 indicate restored values of the picture element values $X_2$ to $X_4$ of the same reference numerals as those in FIG. 3A, further, coefficient calculators 21 and 22, adders 23 and 24, a one-picture-element delay register 25 and a switch 26 are circuits which perform exactly the same functions as the corresponding circuits in FIG. 3A. Accordingly, a predictive value $\overline{X_{12}}$ of the picture element $P_1$ is provided on a line 201. Reference numeral 506 designates the value $X_1$ of the latest picture element. Consequently, the subtractor 27 provides the following predictive error on a line 205:

$$O_{12} = X_1 - \overline{X_{12}} \tag{40}$$

This predictive error is quantized by a quantizer 28 to provide on a line 206 the following difference quantized value:

$$Z_{12} = X_1 - \overline{X_{12}} + \Delta O_{12} \tag{41}$$

In an adder 29, this difference quantized value and the predictive value $\overline{X_{12}}$ are added together to provide the following restored value as 207:

$$X_{12} = X_1 + \Delta O_{12} \tag{42}$$

The restored value $X_{12}$ is applied as 202 to the controller 12 and, at the same time, stored in the auxiliary memory 7. A difference quantized value $Z_{12}$ is applied as 206 to the auxiliary memory part 10 for storage therein.

Figure 5A:
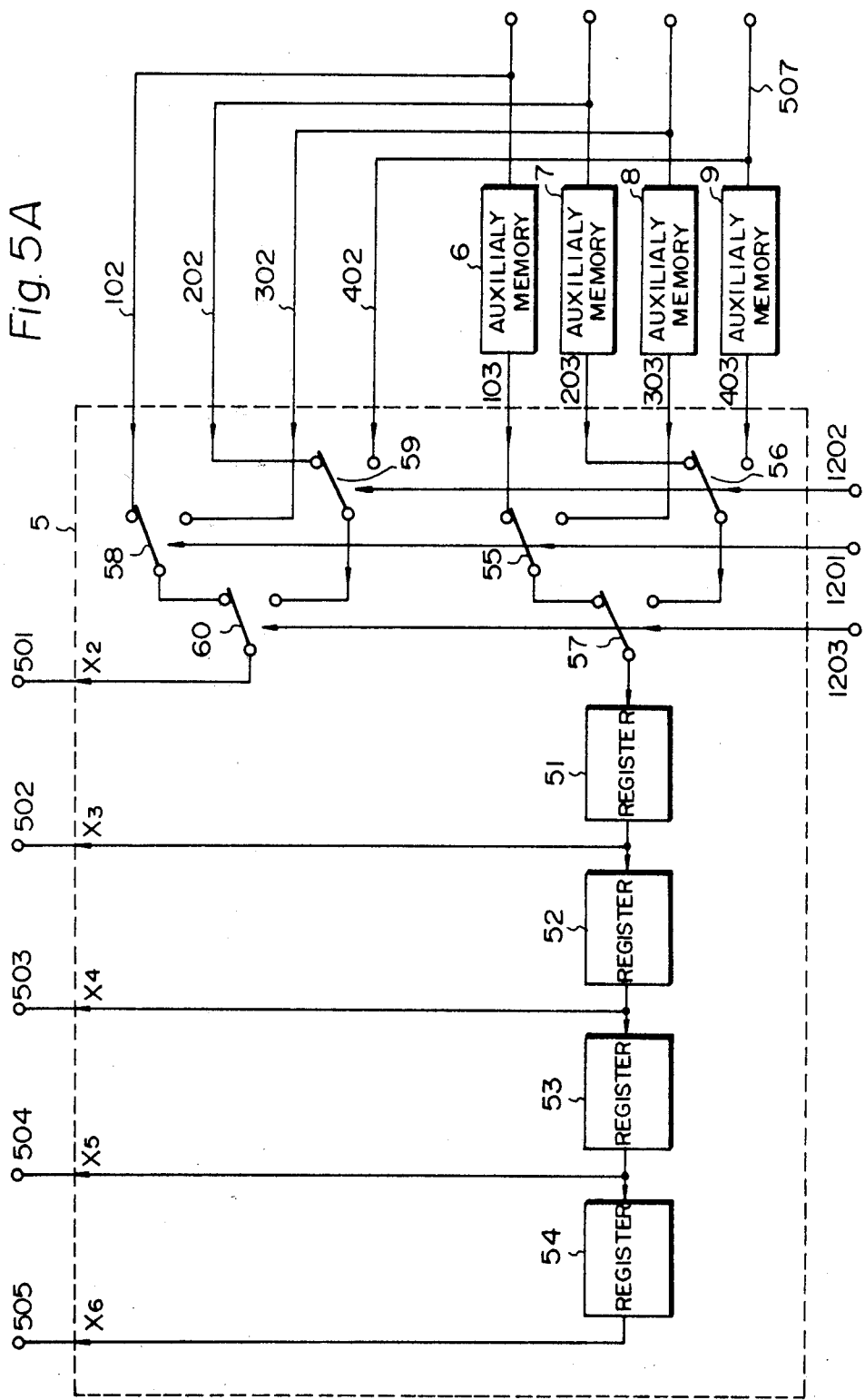
FIG. 5A is a block diagram showing a specific operative example of a memory in the embodiment of FIG. 2A.

FIG. 5A is explanatory of the memory 5. In FIG. 5A, reference numerals 103 to 403 designate outputs of the auxiliary memories 6 to 9, respectively. In this memory 5, switches 55 to 57 are used to select one of the restored values by the four coders with control signals 1201 to 1203 from the controller 12, and the selected signal is stored in registers 51 et seq. for one block period corresponding to eight picture elements. At this time, switches 58 to 60 are used to select by the control signal 1201 the restored value $X_2$ of the picture element next to the first picture element of the block on the left for the prediction thereof (that is, the restored value of the last picture element of the previous block), and the selected restored value is derived at the output 501. Reference numerals 51 to 54 identify four registers and delay times provided by them are set as shown in Table 2.

Table 2

| Register No. | Delay time by each register | Delay time of each register output viewed from input point 507 |
|---|---|---|
| 51 | 2L–9P | 2L–1P |
| 52 | 1P | 2L |
| 53 | 260L–1P | 262L–1P |
| 54 | 1P | 262L |

(1L: a delay of one lines;
1P: a delay of one picture element;
262L: a delay of 262 lines = a delay of one field)

Thus, the restored picture element values $X_2$ to $X_6$ at the picture elements $P_2$ to $P_6$ are read out at the outputs 502 to 505 of the registers 51 to 54. Accordingly, if $X_5$ and $X_6$ are used as the restored picture element values in place of $X_3$ and $X_4$, inter-field coding can be achieved. In concrete terms by replacing the inputs 502 and 503 in FIGS. 3 and 4 are by the outputs 504 and 505 of the memory 5, it is possible to realize the two other coders in this invention, i.e. the inter-field predictive coder (3 in FIG. 2A) and the inter-field difference quantizing coder (4 in FIG. 2A).

Figure 6A:
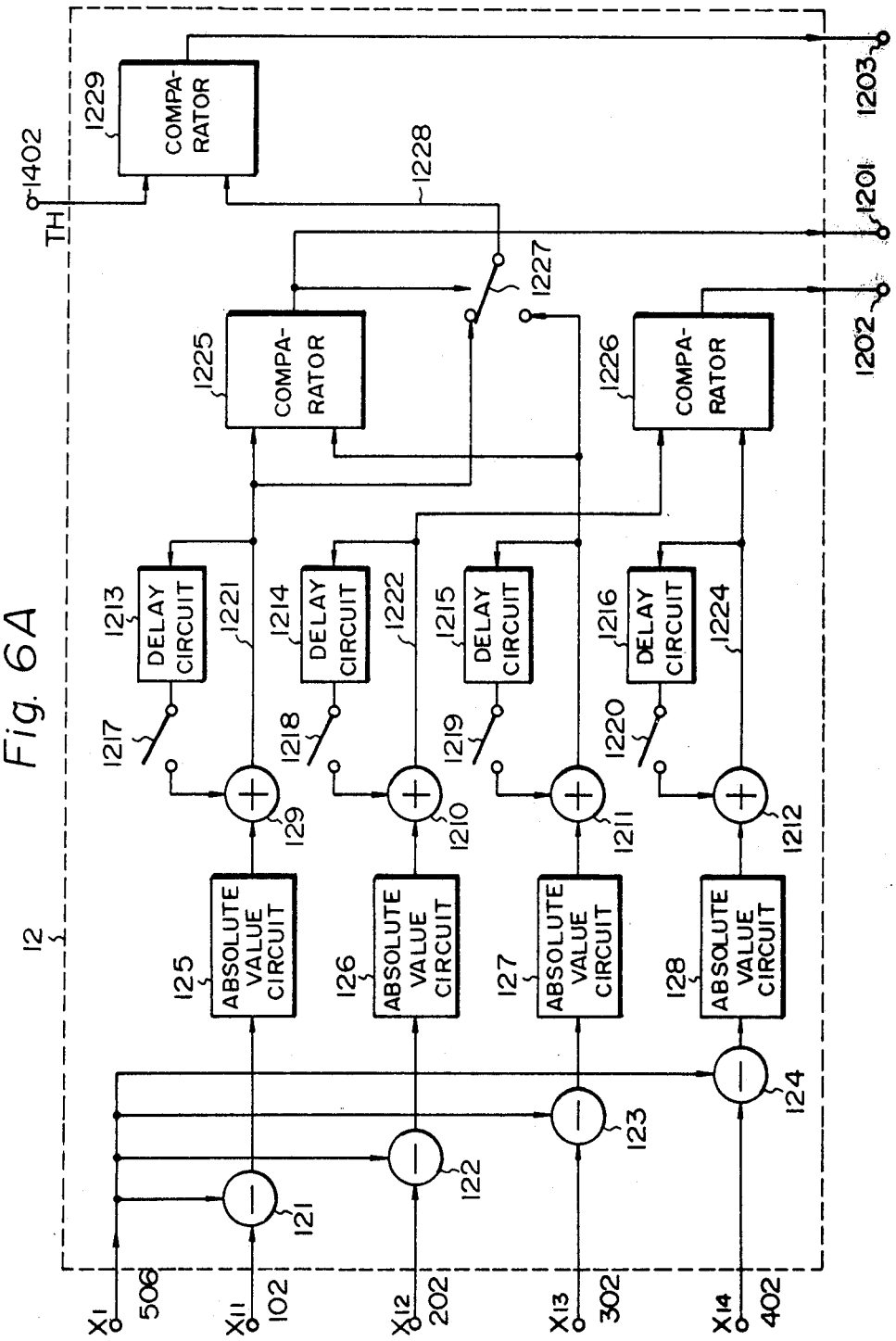
FIG. 6A is a block diagram showing a specific operative example of a controller in the embodiment of FIG. 2A.

Next, a description will be given in connection with the controller (12 in FIG. 2) by which this invention is characterized. FIG. 6A is explanatory of the controller 12. In FIG. 6A, reference numeral 506 indicates the latest picture element value $X_1$ in the current field; 102 to 402 designate restored picture element values $X_{11}$ to $X_{14}$ respectively provided by the coders from the intra-field predictive coder to the inter-field difference quantizing coder; 1402 identifies the threshold value $T_H$ sent from the buffer memory 14 corresponding to the amount of signals stored therein; 121 to 124 denote subtractors for providing respective differences between the true picture element value $X_1$ and the restored values $X_{11}$ to $X_{14}$; and 125 to 128 represent absolute value circuits for providing the absolute values of the differences. Accordingly, the outputs from the circuits 125 to 128 become $|X_1-X_{11}|$ to $|X_1-X_{14}|$, respectively. Reference numerals 129 to 1212 show adders; 1213 to 1216 refer to delay circuits, each providing a delay of one picture element; and 1217 to 1220 indicate switches for zero clearing the adders 129, 1210, 1211 and 1212. At the first element of the block of picture elements, the switches 1217 to 1220 are turned OFF. Consequently, only the absolute values $|X_1-X_{11}|$ to $|X_1-X_{14}|$ of the predictive errors are applied to the adders 129 to 1212. From the second picture element of the same block, the switches 1217 to 1220 are turned ON, so that predictive error values of respectively immediately preceding picture elements, provided by the delay circuits 1213 to 1216, are applied to the adders 129, 1210, 1211 and 1212. As a consequence, after completion of eight picture elements of one block, predictive block error values $$\sum_{i=1}^{8} |X_i - X_{i1}| \text{ to } \sum_{i=1}^{8} |X_i - X_{i4}|$$

are derived at the outputs 1221 to 1224. Reference numerals 1225 and 1226 indicate comparators. The comparator 1225 compares the predictive block error values 1221 and 1223 of the intra-field and inter-field predictive coders with each other to yield the control signal 1201. At the same time, a switch 1227 is changed over, through which the smaller one of the predictive block error values of the intra- and inter-field predictive coders is applied as an output 1228 to the next comparator 1229. The comparator 1226 compares the block error values 1222 and 1224 of the intra- and inter-field difference coders with each other to generate the control signal 1202. The comparator 1229 compares the smaller block error value 1228 of the predictive coder with the threshold value $T_H$ corresponding to the amount of storage in the buffer memory and, in accordance with the comparison result, produces the control signal 1203 for selecting the predictive coding or the difference quantizing and coding.

FIG. 7A shows the transmission line signal coder 13 in this invention. In FIG. 7A reference numerals 204 and 404 indicate difference quantized values derived from the difference quantizing coders 2 and 4, respectively; 1201 to 1203 designate signals produced by the controller 12 for indicating the intra- and inter-field coding and the presence or absence of the difference quantization; 131 identifies a switch for selecting either one of the intra-field coding and the inter-field coding from the difference quantized values 204 and 404; 132 denotes a switch for selecting the inclusion or exclusion of the difference quantization; and 133 and 134 represent code converters. The quantizer 28 of the difference quantizing coder 2 in FIG. 4 performs quantization of thirteen levels, including both positive and negative ones, seven of these levels near zero are converted by the code converter 133 to a 3-bit transmission code and the six remaining levels to a 6-bit transmission code. In the code converter 134, the signals respectively indicating the intra-field coding and the inter-field coding and the inclusion or exclusion of the difference quantization are each converted to a transmission code of two bits per block. These converters 133 and 134 are formed with read-only memories.

Figure 8:
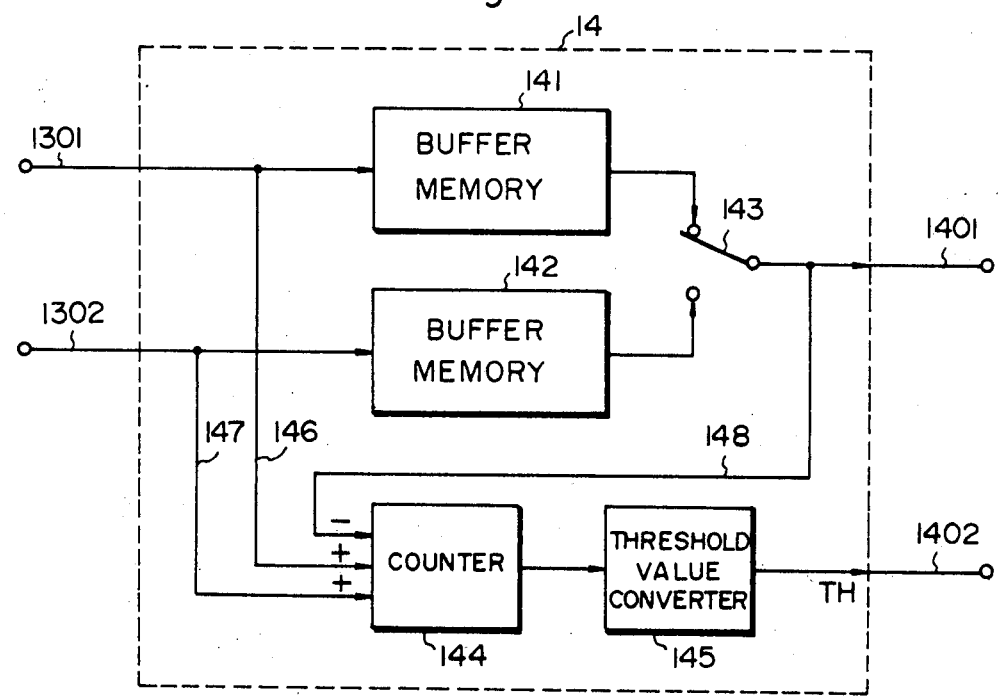
FIG. 8A is a block diagram illustrating a specific operative example of a buffer memory in the embodiment of FIG. 2A.

FIG. 8A illustrates the buffer memory 14 in this invention. The difference signal and the block signal converted to the transmission line codes are respectively applied as signals 1301 and 1302 and stored in buffer memories 141 and 142. Further, the numbers of bits of the transmission signals simultaneously applied are applied in a counter 144. A switch 143 is used to select the block signal and the difference signal in this order by which data is read out, block signals of one line and then difference signals of one line. The transmission signal is read out as a signal 1401 at a constant rate to be provided on the transmission line, while the number of transmitted bits 148 is applied to the counter 144 to decrease its count value by the number of bits read out. Consequently, the counter 144 indicates the number of bits stored in the buffer memory 14 at the instant time. The number of stored bits is sent to a threshold value converter 145 formed by a read-only memory, by which the threshold value $T_H$ is produced in correspondence to the instant amount of storage in the buffer memory 14 and provided at a terminal 1402.

Next, a description will be made with regard to another example of the construction of the high efficiency coding system employing the adaptive predictive coding of this invention.

Figure 2B:
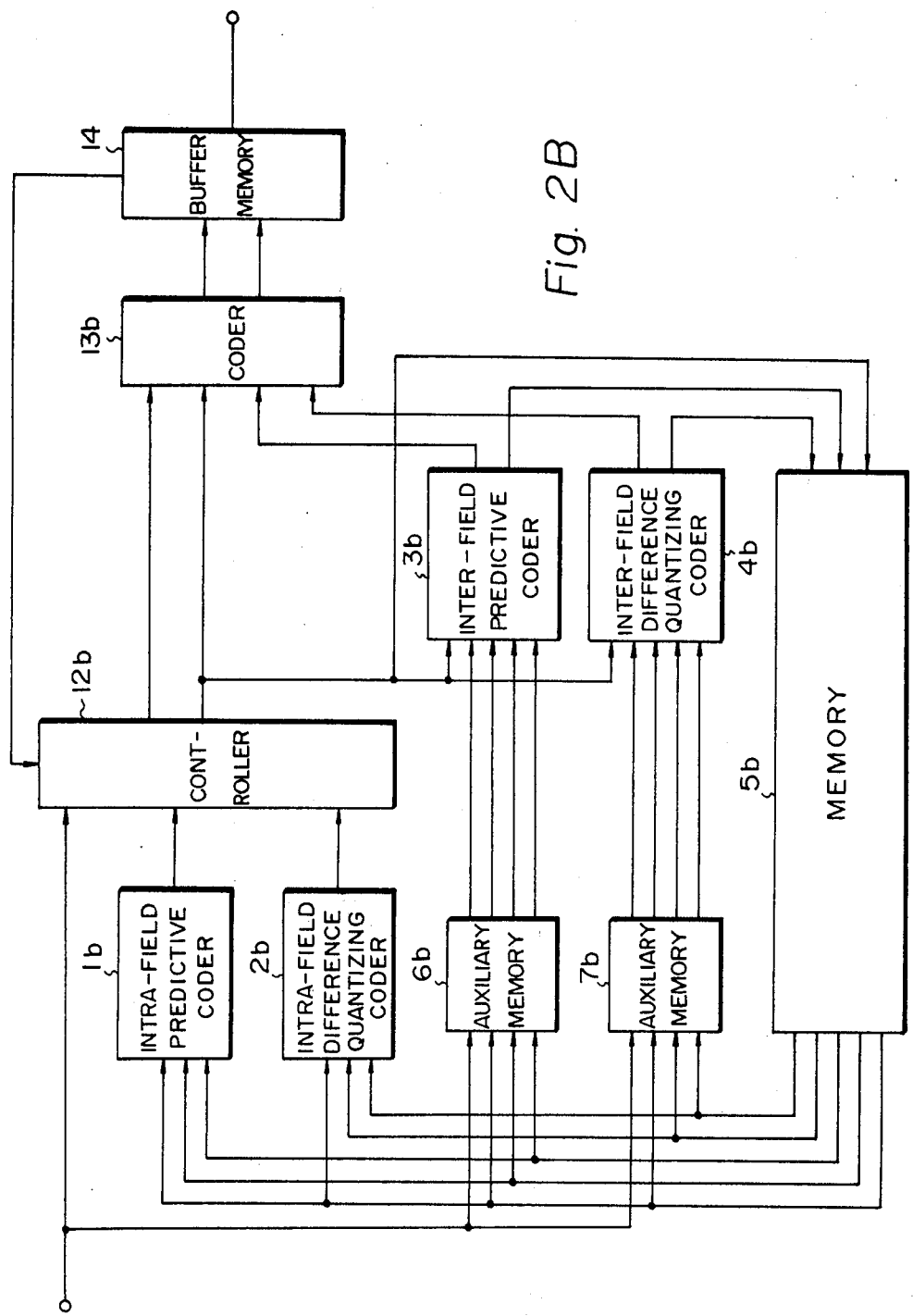
FIG. 2B is a block diagram showing an embodiment of the adaptive coding system of this invention which selects the predictive coding system by using the time picture element.

FIG. 2B shows in block form the adaptive coding system for selecting the predictive coding system by using a true picture element value. Reference numeral 1b indicates an intra-field predictive coder; 2b designates an inter-field predictive coder; 3b identifies an intra-field coder; 4b denotes an inter-field coder; 5B represents a memory capable of storing television signals of substantially one field; 6b and 7b show auxiliary memories capable of storing television signals of more than eight picture elements; 12b refers to a controller for selecting, for each block, a suitable one of the four modes of predictive coding including the intra-field predictive coding to the inter-field difference quantizing and coding; 13b indicates a coder for rendering a difference quantized value into a variable length code and producing a transmission line signal indicating the coding unit selected by the control unit 12b; and 14 designates a buffer memory for sending out transmitted signals to the transmission line at a constant rate.

The coders 1b to 4b and the controller 12b are characterized parts of this invention and will hereinbelow be described in detail.

Figure 3B:
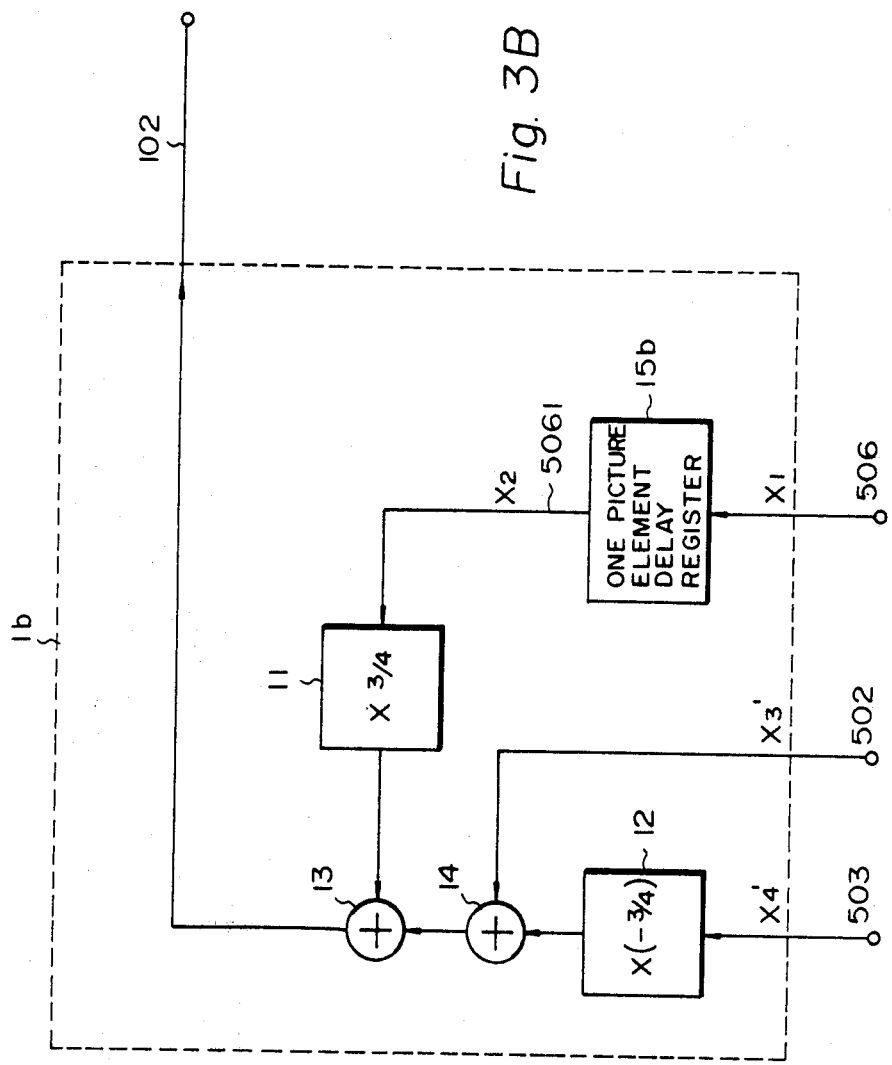
FIG. 3B is a block diagram illustrating a specific operative example of an intra-field predictive coder in the embodiment of FIG. 2B.

FIG. 3B illustrates the intra-field predictive coder. In FIG. 3B, reference numerals 502 and 503 indicate the restored values $X_3$ and $X_4$ of the picture elements $P_3$ and $P_4$, respectively, which are supplied from the memory unit 5b; and 506 designates the true value of an input picture element signal. At the output 5061 of a register 15b for providing a delay of one picture element, thereis derived the true value $X_2$ of the picture element $P_2$. In FIG. 3B, reference numerals 11 and 12 identidy coefficient calculators, which respectively achieve multiplications of $\frac{3}{4}$ and $-\frac{3}{4}$, each using a shift register, an adder and a substrator; and 13 and 14 denote an adder, by which is produced the following predictive value $\overline{tX_{11}}$ of the latest picture element:

$$\overline{tX_{11}} = \tfrac{3}{4}X_2 + X_3 - \tfrac{3}{4}X_4 \tag{39a}$$

The predictive value thus produced is provided as a signal 102 to the controller 12b. The intra-field predictive coder of FIG. 3B is identical in construction with the inter-field predictive coder 2b in FIG. 2B, and the stored values $X_5$ and $X_6$ of the picture elements $P_5$ and $P_6$ are provided as input signals 502 and 503 from the memory 5b.

Figure 6B:
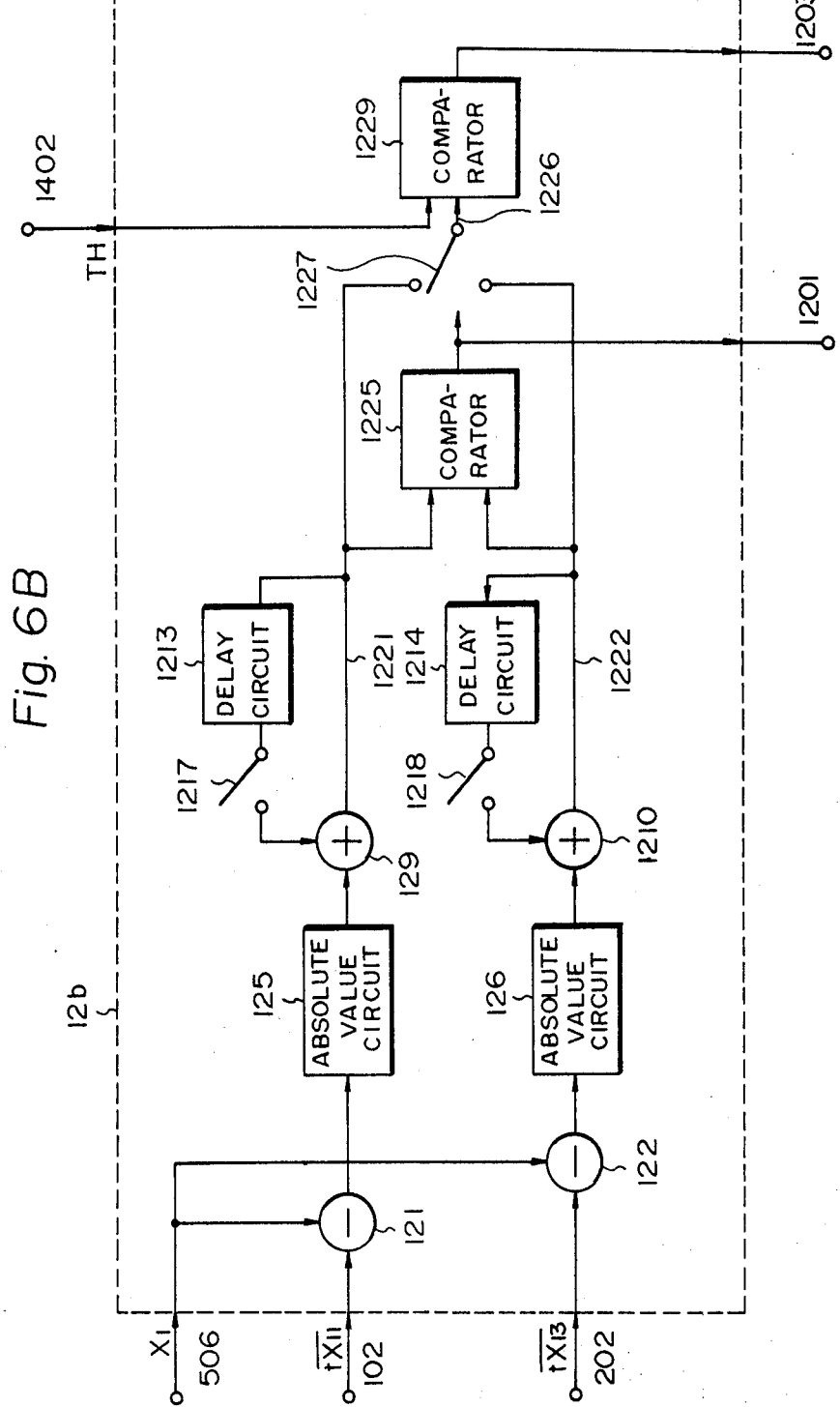
FIG. 6B is a block diagram showing a specific operative example of the controller utilized in the embodiment of FIG. 2B.

Next, a description will be given of the controller (12b in FIG. 2B) which is a characterized part of this invention. FIG. 6B is a diagram explanatory of the controller 12b. In FIG. 5B, reference numeral 506 indicates the latest picture element value $X_1$; 102 and 202 designate predictive picture element values $\overline{tX_{11}}$ and $\overline{tX_{13}}$ respectively yielded by the intra-field and the inter-field predictive coders; 1402 identifies a threshold value $T_H$ sent from the buffer memory 14 in dependence upon the amount of data stored therein; 121 and 122 denote substractors for obtaining differences between the true picture element value $X_1$ and the predictive values $\overline{tX_{11}}$ and $\overline{tX_{13}}$, respectively; 125 and 126 represent absolute value circuits for obtaining the absolute values of the differences, $|X_1 - \overline{tX_{11}}|$ and $|X_1 - \overline{tX_{13}}|$; 129 and 1210 show adders; 1213 and 1214 refer to delay circuits, each providing a delay of one picture element; and 1217 and 1218 indicate switches for zero clearing the adders 129 and 1210, respectively. At the first element of the block switches 1217 and 1218 are turned OFF, so that the inputs to the adders 129 and 1210 are only the absolute values of the errors of the respective predictive values, $|X_1 - \overline{tX_{11}}|$ to $|X_1 - \overline{tX_{13}}|$. From the occurrence of the second picture element in the same block the switches 1217 and 1218 are turned ON, by which errors of predictive values of respectively immediately preceding picture elements are provided to the adders 129 and 1210 from the delay circuits 1213 and 1214. As a consequence, after completion of eight picture elements of one block, errors of the predictive values of the block, $$\sum_{i=1}^{8} |X_i - \overline{tX_{i1}}| \text{ to } \sum_{i=1}^{8} |X_i - \overline{tX_{i3}}|,$$

are derived as outputs 1221 and 1222 from the adders 129 and 1210. Reference numeral 1225 indicates a comparator, which compares the errors of the predictive values 1221 and 1222 of the block with each other, obtained by the intra-field and the inter-field predictive coders, to provide a control signal 1201. At the same time, a switch 1227 is changed over to apply, as an output 1228, a smaller one of the errors of the predictive values of the block to a next comparator 1229. The comparator 1229 compares the smaller one 1228 of the block errors of the predictive coding units with the threshold value $T_H$ corresponding to the amount of data stored in the buffer memory 14, thereby to generate a control signal 1203 for selecting either the predictive coding mode or the difference quantizing and coding mode of operation.

Figure 4B:
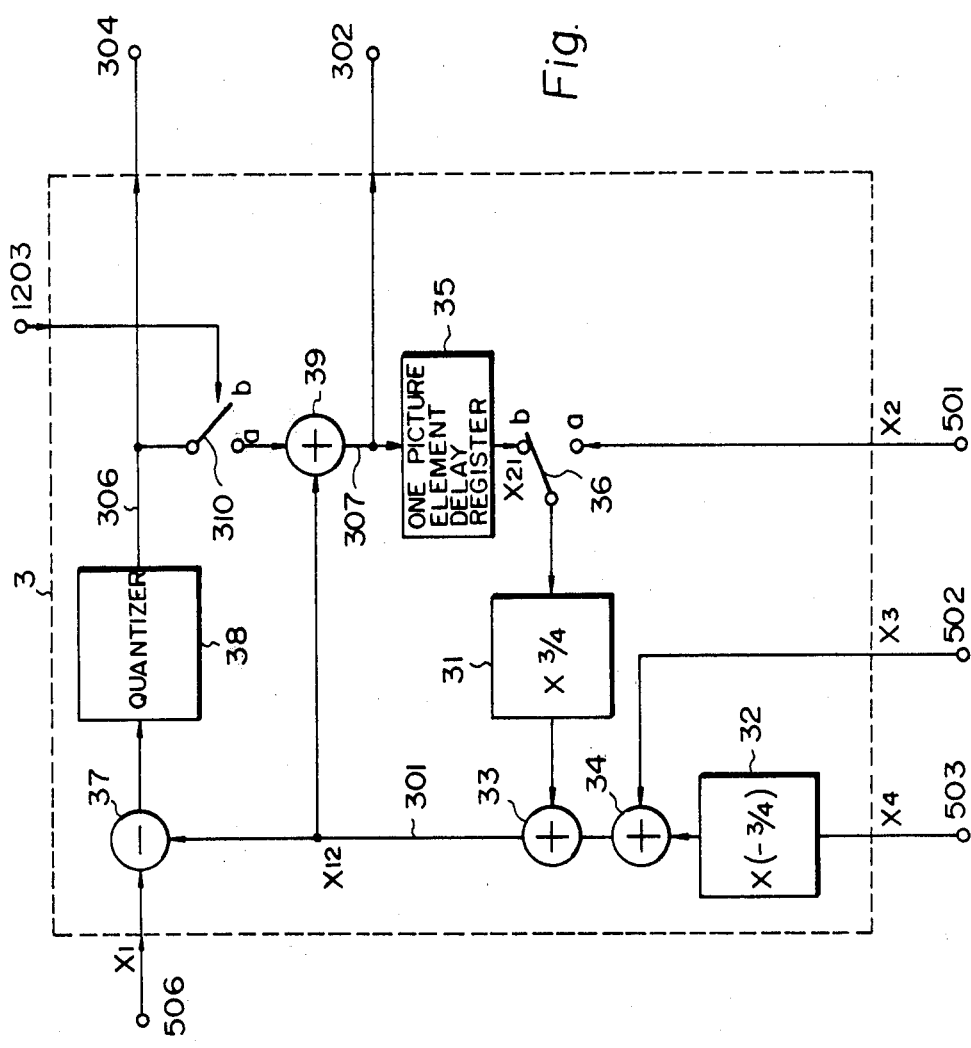
FIG. 4B is a block diagram illustrating a specific operative example of an intra-field predictive coder in the embodiment of FIG. 2B.

FIG. 4B is a diagram explanatory of a method for realizing the intra-field coder 3b. In FIG. 4B, reference numerals 501 to 503 indicate the restored values $X_2$ to $X_4$ of the picture element $P_2$ to $P_4$. Coefficient calculators 31 and 32 and adders 33 and 34 are those which respectively perform exactly the same functions as the corresponding circuits in FIG. 3B. Reference numeral 35 designates a register which provides a delay corresponding to one picture element and hence produces a restored value $X_{21}$ of an immediately preceding picture element restored by the selected predictive coder. A switch 36 is to select either one of the restored values $X_2$ and $X_{21}$ and changed over to the side a for the first one of the eight picture elements of one block and to the side b for the other remaining picture elements.

A switch 310 is controlled by the signal 1203 indicating whether the difference quantization has been selected by the controller 12b. The switch 310 is changed over to the side a or b in dependence upon whether the difference quantization has been selected or not. On a line 301 there is provided a predictive value $\overline{tX_{11}}$ of the picture element $P_1$. A subtractor 37 provides on a line 305 the following error of the predictive value:

$$O_1 = X_1 - \overline{tX_{11}} \tag{40b}$$

This is quantized by a quantizer 38 to provide on a line 306 the following difference quantized value:

$$Z_1 = X_1 - \overline{tX_{11}} + \Delta O_1 \tag{41b}$$

When the switch 310 lies on the side a, the difference quantized value 306 and the predictive value $\overline{tX_{11}}$ are added together by an adder 39 to derive therefrom as a signal 307 the following restored value:

$$X_{11} = X_1 + \Delta O_1 \tag{42b}$$

The restored value $X_{11}$ is stored as a signal 302 in the memory 5b. The difference quantized value $Z_1$ is applied as a signal 304 to the transmitted signal coder 13b. The intra-field coder of FIG. 4B is identical in construction with the inter-field coder 4b in FIG. 2B, and the input signals 502 and 503 are the restored values $X_5$ and $X_6$ of the picture elements $P_5$ and $P_6$ supplied from the memory 5b, respectively.

FIG. 5B is a diagram explanatory of the memory 5b. In FIG. 5B, reference numerals 302 and 402 indicate the restored signals from the intra-field and inter-field coders, respectively. The memory 5b employs a switch 55 to select one of the restored values of the two coders by the signal 1201 indicating the intra-field or inter-field coding which is provided from the controller 12b, and the selected restored value is stored in a register 51b et seq.

Reference numerals 51b to 54 designate four registers, whose delay times are set as shown in Table 3.

Table 3

| Register No. | Delay time of each register | Delay time of each register output viewed from input point 507 |
|---|---|---|
| 51b | 2L-1P | 2L-1P |
| 52 | 1P | 2L |
| 53 | 260L-1P | 262L-1P |
| 54 | 1P | 262L |

(1L: a delay of one line;
1P: a delay of one picture element;
262L: a delay of 262 lines = a delay of one field)

Thus, the restored picture element values $X_2$ to $X_6$ at the points $P_2$ to $P_6$ are read out at outputs 502 to 505 of the registers 51b to 54.

FIG. 7B shows the transmitted signal coder 13b used in this embodiment. In FIG. 7B, reference numerals 304 and 404 identify the difference quantized values respectively derived from the coders 3b and 4b; 1201 and 1203 denote the signals produced by the controller 12b to indicate whether the intra-field or inter-field coding mode has been selected and whether the difference quantizing mode has been selected or not; 121 represents a switch for selecting either one of the difference quantized values 304 and 404 of the intra-field and the inter-field coding; 132 refers to a switch which is changed over in dependence on whether the difference quantization has been selected or not; and 133 and 134 show code converters. By the quantizer 38 utilized in FIG. 4B, quantization of thirteen levels in all is effected, and in the code converter 133, seven levels adjoining the zero level are converted to a 3-bit transmission code and the remaining six levels are converted to a 6-bit transmission code. In the code converter 134, the signal indicating whether the intra-field or inter-field coding has been selected and the signal indicating whether the difference quantization has been selected or not are each converted to a transmission code of two bits forming one block. The code converters 133 and 134 are each formed with a read-only memory.

The above is an example of the construction of the adaptive coding system which selects the predictive coding system through the use of the true picture element value.

Next, a description will be made in connection with an example of the construction of another adaptive predictive coding system of this invention.

Figure 2C:
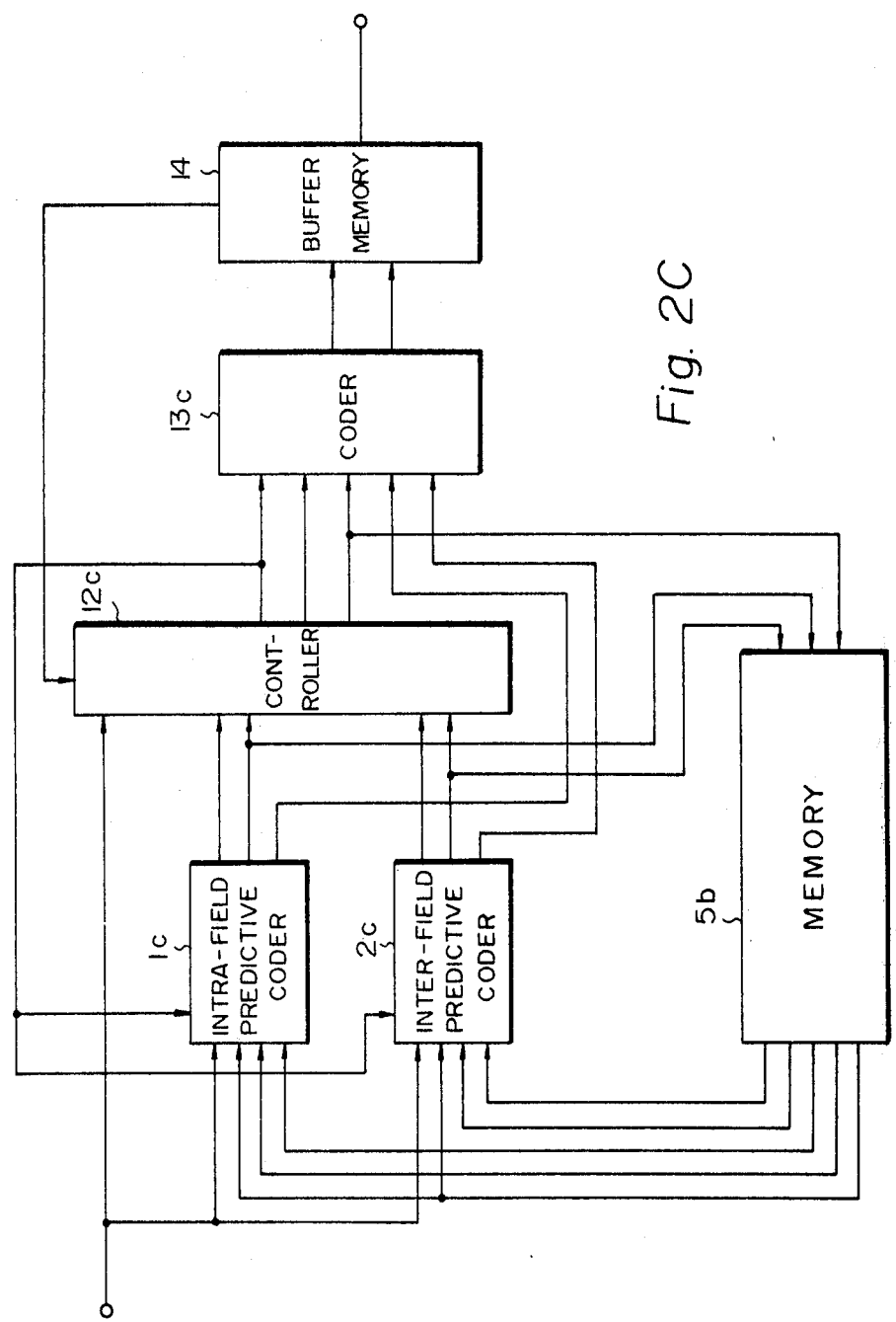
FIG. 2C is a block diagram illustrating an embodiment of the adaptive coding system of this invention which indicates, by one bit for each picture element, whether the coding selected is the inter-field or intra-field predictive coding and whether the difference quantization elected or not.

FIG. 2C is a block diagram of the adaptive coding system which indicates, by one bit per picture element, whether the intra-field or inter-field predictive coding mode has been selected and whether the difference quantization has been selected or not. In FIG. 2C, reference numeral 1c indicates an intrafield predictive coder; 2c designates an inter-field predictive coder; 5b identifies a memory capable of storing television signals of substantially one field; 12c denotes a controller for selecting, for each picture element, either the intra-field or inter-field predictive coding mode, and for selecting either inclusion or exclusion of the difference quantization; 13c represents a transmitted line signal coder for rendering a difference quantized value into a variable length code and adding a signal indicating the coding mode selected by the controller 12c; and 14 shows a buffer memory for sending out transmitted signal to the transmission line at a constant rate.

The coding units 1c and 2c and the controller 12c are characterized parts of this invention.

Figure 4C:
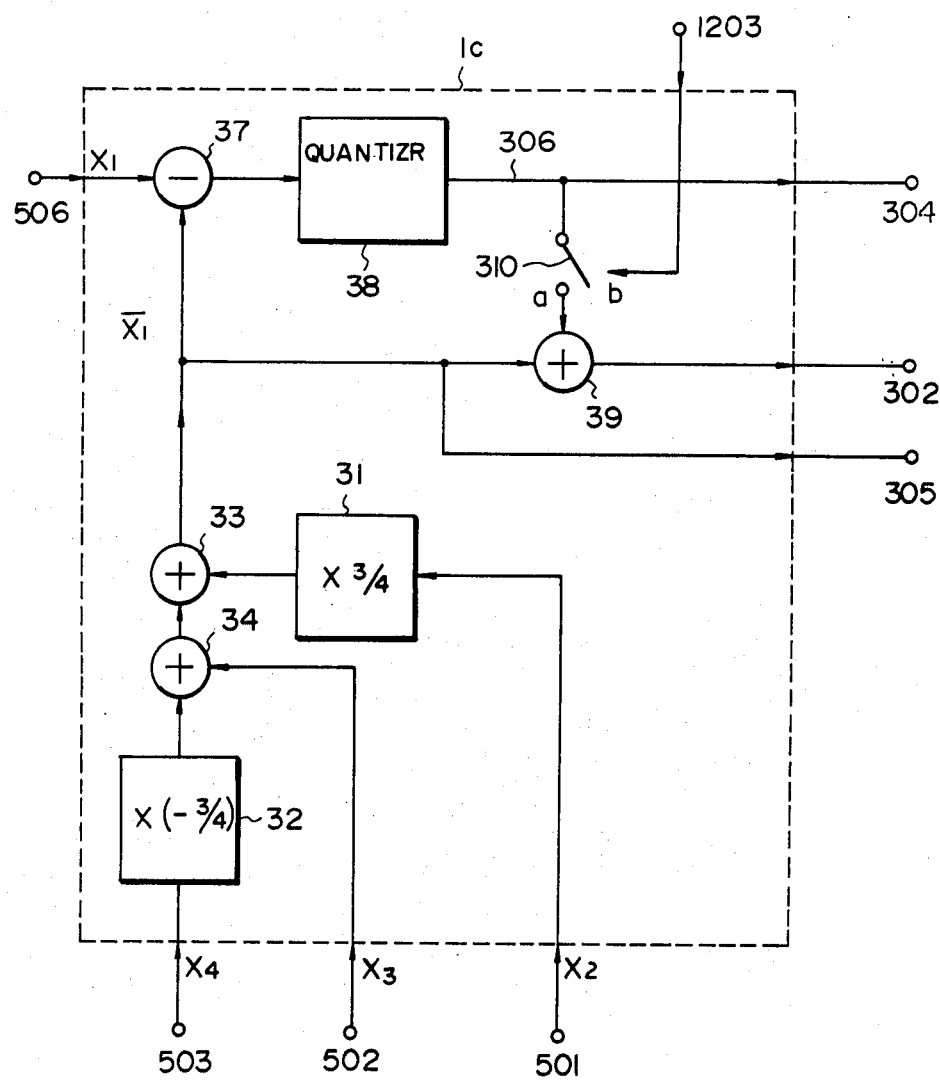
FIG. 4C is a block diagram showing a specific operative example of an intra-field predictive coder in the embodiment of FIG. 2C.

FIG. 4C is a diagram explanatory of an example of the intra-field predictive coder 1c. In FIG. 4C, reference numerals 501, 502 and 503 indicate restored values $X_2$, $X_3$ and $X_4$ of the picture elements $P_2$, $P_3$ and $P_4$, respectively, which values are supplied from the memory 5b; 31 and 32 designate coefficient calculators, which respectively achieve multiplications of $\frac{3}{4}$ and $-\frac{3}{4}$ by the use of a shift register, an adder and a subtractor; and 33 and 34 identify adders, by which the following predictive value $\overline{X_{11}}$ of the latest picture element is produced:

$$\overline{X_{11}} = \tfrac{3}{4}X_2 + X_3 - \tfrac{3}{4}X_4 \tag{39c}$$

The picture element value thus obtained is applied as a signal 305 to the controller 12c and a subtractor 37.

Reference numeral 506 denotes the value $X_1$ of the latest picture element. Accordingly, the subtractor 37 proviees on the line 307 the following error of the predictive value:

$$O_1 = X_1 - \overline{X_{11}} \tag{40c}$$

This is quantized by a quantizer 38 to provide as a signal 306 the following difference quantized value:

$$Z_1 = X_1 - \overline{X_{11}} + \Delta O_1 \tag{41c}$$

A switch 310 is controlled by the signal 1203 indicating whether or not the difference quantization has been selected by the controller 12C; namely, the switch 310 is changed over to the side a or b in dependence upon whether or not the difference quantization has been selected. When the switch 310 lies on the side a, the difference quantized value 306 and the predictive value $\overline{X_1}$ are added together by an adder 39 to provide as a signal 302 the following restored value:

$$X_{11} = \overline{X_1} + \Delta O \tag{42c}$$

The difference quantized value $Z_1$ is applied as a signal 304 to the transmitted signal coder 13c. The intra-field predictive coder of FIG. 4C is identical in construction with the inter-field predictive coding unit 2c in FIG. 2C, and restored values $X_5$ and $X_6$ of the picture elements $P_5$ and $P_6$ are derived as input signals 502 and 503.

Next, a description will be given in connection with the controller 12c in FIG. 2C which is the characterized part of this invention. FIG. 6C is a diagram explanatory of the controller 12c. In FIG. 6C, reference numeral 506 indicates the latest picture element value $X_1$ in the current field; 305 and 405 designate the predictive picture element values $\overline{X_{11}}$ and $\overline{X_{13}}$ respectively yielded by the intra-field and inter-field predictive coders; 302 and 402 identify the restored picture element values $X_{11}$ and $X_{13}$; 1402 denotes a threshold value $T_H$ derived from the buffer memory 14 in accordance with the amount of data stored therein; 1230 represents a subtractor for obtaining a difference between the intra-field and inter-field predictive values $\overline{X_{11}}$ and $\overline{X_{13}}$; 1231 shows an absolute value circuit for obtaining the absolute value of the abovesaid difference to provide $|\overline{X_{11}}-\overline{X_{13}}|$ on a line 1239; 1238 refers to a counter for providing a threshold value D predetermined between the transmitting and receiving sides to indicate the magnitude of the difference between the intra-field and the inter-field predictive values; and 1232 indicates a comparator for comparing the absolute value circuit output $|\overline{X_{11}}-\overline{X_{13}}|$ on the line 1239 with the threshold value D to provide the compared output on each of lines 1204, 1234 and 1235.

Reference numerals 121 and 122 designate circuits for obtaining differences between the true picture element value $X_1$ and the predictive values $\overline{X_{11}}$ and $\overline{X_{13}}$, and 125 and 126 identify absolute value circuits for obtaining the absolute values of the abovesaid differences to provide $|X_1-\overline{X_{11}}|$ and $|X_1-\overline{X_{13}}|$. Reference numeral 1225 denotes a comparator for comparing errors of the predictive values from the intra-field and inter-field predictive coders with each other to produce a control signal 1201. A switch 1233 is changed over by the output control signal 1234 from the comparator 1232 to the side b or a in dependence upon whether the difference between the intra-field and inter-field predictive values is larger or smaller than the threshold value D. Accordingly, if the abovesaid difference is in excess of the threshold value D, the comparator 1225 provides its output 1201 on a line 1240, whereas if the difference is smaller than the threshold value D, a signal 1241 indicating the intra-field or inter-field predictive coding mode for the immediately preceding picture element, held by a delay circuit 1213 for producing a delay of one picture element, is provided on the line 1240. A switch 1227 is connected by the output 1240 to the side a or b to select the intra-field or inter-field predictive value.

In a comparator 1229, the smaller one 1228 of the prediction errors is compared with the threshold value $T_H$ corresponding to the amount of data stored in the buffer memory 14 to generate a control signal 1236 for selecting the predictive coding accompanied or unaccompanied by the difference quantizing. An OR circuit 1237 produces the logical sum of the control signal 1236 and the output control signal 1235 derived from the comparator 1232, providing an output 1203.

Figure 7C:
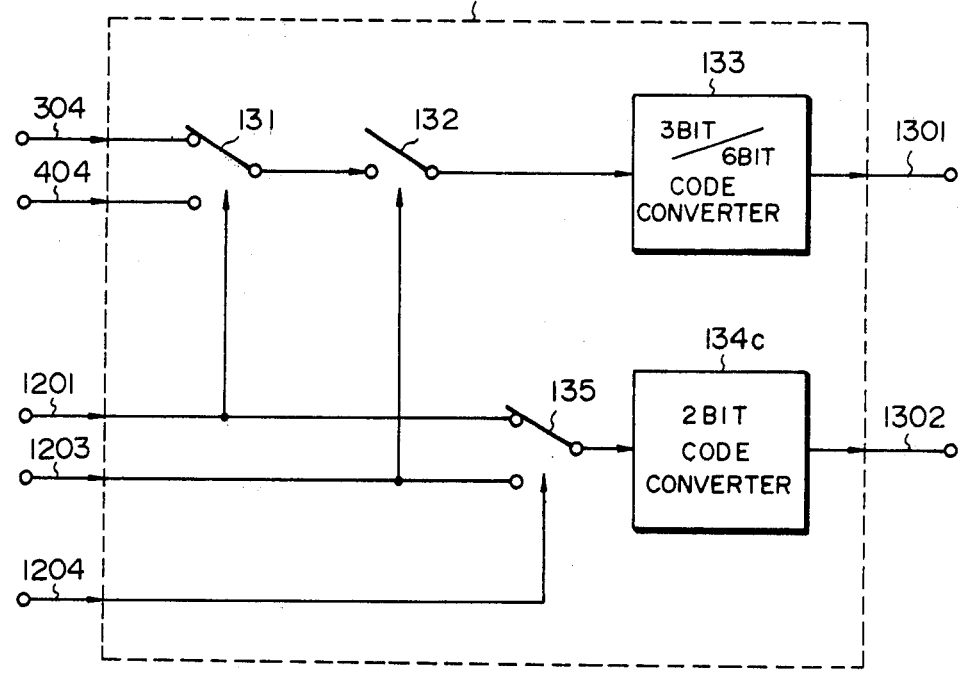
FIG. 7C is a block diagram showing a specific operative example of the transmitted signal coder employed in the embodiment of FIG. 2C.

FIG. 7C illustrates the transmitted signal coder 13c in this embodiment. In FIG. 7C, reference numerals 304 and 404 indicate the difference quantized values provided from the predictive coders 1C and 2C in FIG. 2C; 1201 and 1203 designate the signals from the controller 12c which respectively indicate whether the predictive coding is the intra-field or inter-field one and whether the predictive coding is accompanied or unaccompanied by the difference quantization; 131 idenfifies a switch for selecting either one of the difference quantized values 304 and 404 produced by the intra-field predictive coding and the inter-field predictive coding; 132 denotes a switch for selecting the coding accompanied or unaccompanied by the difference quantization; 135 represents a switch by which either the signal 1201 indicating whether the coding is the intra-field or inter-field one or the signal 1203 indicating whether the coding is accompanied or unaccompanied by the difference quantization is selected in accordance with the signal 1204 indicating the difference between the intra-field and inter-field predictive values; 133 shows a code converter which is identical with those 133 in FIGS. 7A and 7B; and 134c refers to another code converter which converts the signal selected by the switch 135 to a transmitted code of one bit per picture element. The code converters 133 and 134c are respectively formed with read-only memories.

The above has described example of the construction of the adaptive coding system which indicates, by one bit per picture element, whether the coding is the intra-field or inter-field predictive coding and whether the coding is accompanied or unaccompanied by the difference quantization.

The above is the blocks of the transmitting side formed according to this invention. FIG. 9A is a block diagram for receiving information transmitted in accordance with this invention from the transmitting side shown in FIG. 2A. In FIG. 9A, reference numeral 14a indicates a buffer memory corresponding to that 14 in the block diagram of the transmitting side, which receives the block indicating signal and the differential signal 1401 transmitted over the transmission line at a constant rate and stores therein, from which the block indicating signal and the difference signal are respectively read out as signals 1301 and 1302 in synchronism with a synchronizing signal for the television signal decoding use. In FIG. 9, reference numeral 13a designates a transmitted signal decoder provided in correspondence to the block 13 at the transmitting side. The signal 1301 representing the block indicating signal and the signal 1302 representing the difference signal are decoded by the decoder 13a to intra- and inter-field difference signal values 204 and 404 and control signals 1201 to 1203. A controller 12a corresponds to the block 12 of the transmitting side and supplies the received difference signal values to an intra- or inter-field difference decoder. Reference numerals 1a to 4a identify decoders respectively corresponding to the coders 1 to 4 of the transmitting side, 1a being an intra-filed predictive decoder, 2a an intra-field difference decoder, 3a an inter-field predictive decoder and 4a an inter-field difference decoder. The decoders use the restored values of adjoining picture elements read out from a memory 5a and the difference quantized values (only in cases of 2a and 4a) to decode the restored values $X_{11}$ to $X_{14}$ of the instant picture elements. The memory 5a corresponds to the block 5 of the transmitting side and, by using the control signals 1201 to 1203, selects from the restored values $X_{11}$ to $X_{14}$ an instant picture element value 507 selected at the transmitting side. The selected picture element value is provided as the output signal from a decoding device of the receiving side and, at the same time, stored in a memory and used for the production of a predictive value in the subsequent decoding operation.

Figure 9B:
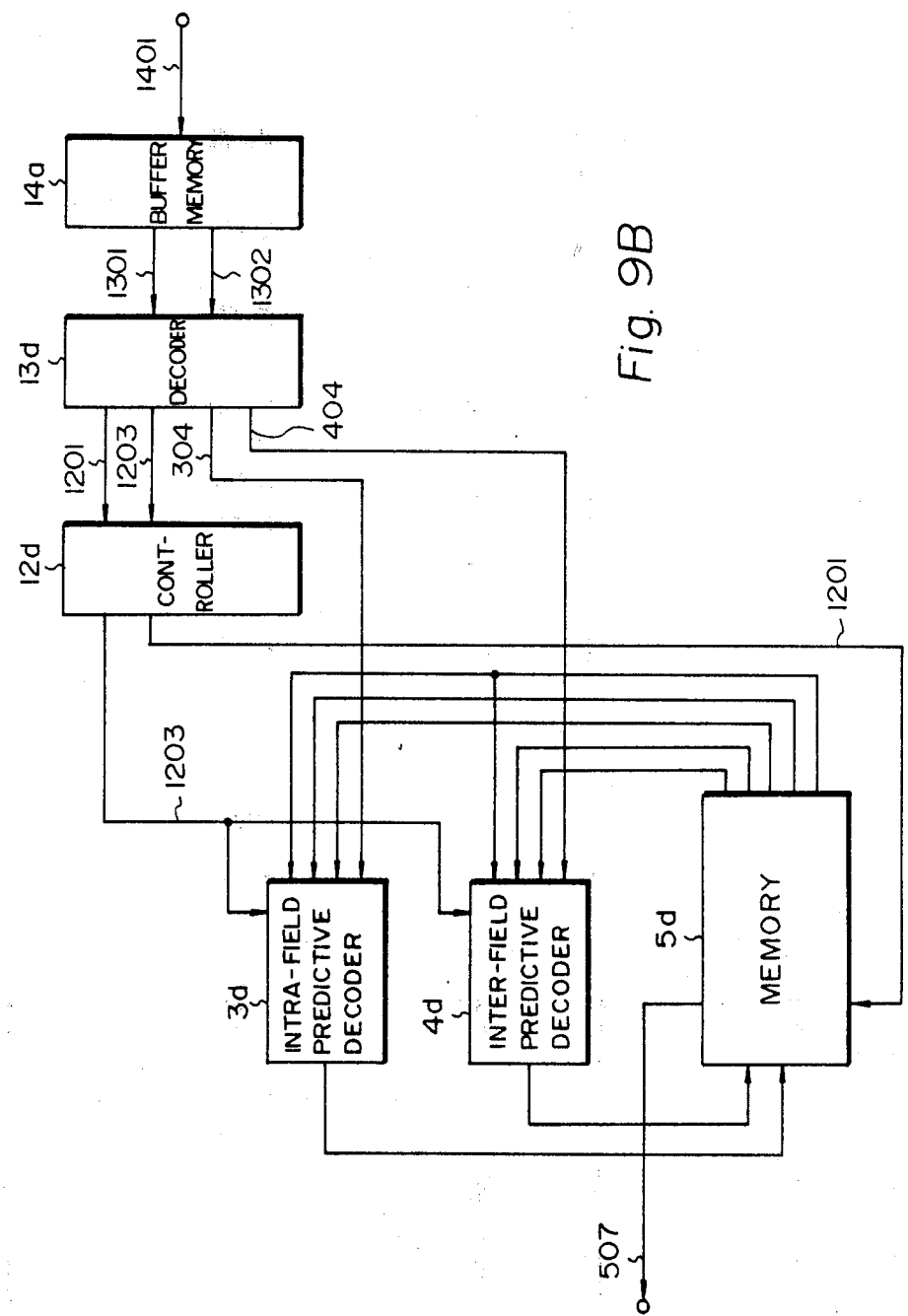
FIG. 9B is a block diagram of the receiving side, corresponding to FIG. 2B.

FIG. 9B is a block diagram of the receiving side provided in correspondence to the adaptive coding system which selects the predictive coding system by using the true picture element and corresponds to FIG. 2B. In FIG. 9B, reference numeral 14a indicates a buffer memory corresponding to that 14 in FIG. 2B, which receives a block indicating signal and a difference signal 1401 transmitted over the transmission line at a constant rate and reads them out as a block indicating signal 1301 and a difference signal 1302 in synchronism with a synchronizing signal stored therein for decoding the television signals; and 13d designates a transmitted signal decoder corresponding to that 13b on the transmitting side. The transmitted signals 1301 and 1302 respectively indicating the difference signal and the block indicating signal are respectively decoded by the decoder 13d to the intra-field and inter-field difference signal values 304 and 404 and the control signals 1201 and 1203. A controller 12d corresponds to that 12b on the transmitting side and supplies to a decoder 3d or 4d the signal 1203 indicating whether the coding is accompanied or unaccompanied by the difference quantization and to a memory 5d the signal 1201 indicating the coding selected is the intra-field predictive one or the inter-field predictive one. The decoders 3d and 4d respectively correspond to the coders 3b and 4b used at the transmitting side, the former 3d being an intra-field predictive coded signal decoder and the latter 4d an inter-field predictive coded signal decoder. The decoders decode the restored values $X_{11}$ and $X_{13}$ of the instant picture elements by utilizing the adjoining restored picture elements read out from the memory 5d and the difference quantized values. The memory 5d corresponds to that 5b of the transmitting side and employ the control signal 1201 in the restored values $X_{11}$ and $X_{13}$ to select the instant picture element value 507 selected on the transmitting side and provides it as an output signal from the decoding device of the receiving side and stores it in a memory for use in the production of a predictive value in the subsequent decoding operation.

FIG. 9C shows, in block form, corresponding to FIG. 2C, the receiving side of the adaptive coding system which indicates, by one bit for each picture element, whether the coding selected is the intra-field or inter-field predictive one and whether the coding is accompanied or unaccompanied by the difference quantization. In FIG. 9C, reference numeral 14a indicates a buffer memory corresponding to that 14 of the transmitting side, which receives a difference signal and a picture element mode indicating signal 1401 transmitted over the transmission line at a constant rate and stores them therein and reads them out as a mode indicating signal 1301 and a difference signal 1302 in synchronism with a synchronizing signal for decoding television signals. Reference numeral 13e designates a transmitted signal decoder corresponding to that 13c of the transmitting side. The transmitted signal 1301 representing the difference signal and the transmitted signal 1302 representing the mode indicating signal are decoded by the transmitted signal decoder 13e and supplied to a control unit 12e. The control unit 12e corresponds to that 12c of the transmitting side and decides from the intra-field and inter-field predictive values 305 and 405 whether the absolute value of the difference between the both predictive values is larger or smaller than the threshold value D, thereby detecting whether the picture element mode signal 1302 is a signal indicating the coding mode accompanied or unaccompanied by the difference quantization or a signal indicating the intra-field or interfield predictive coding. As a result of this, the controller 12e produces the signal 1203 indicating whether the predictive coding is accompanied or unaccompanied by the difference quantization and the signal 1201 indicating the distinction between the intra-field and inter-field predictive coding and applies the signal 1203 to the intra-field and inter-field predictive coded signal decoders 1e and 3e and the signal 1201 to the memory 5d. The decoders 1e and 2e respectively correspond to those 1c and 2c in FIG. 2C. The decoders 1c and 2c decode the restored values $X_{11}$ and $X_{13}$ of instant picture elements by using the neighboring restored values of picture elements adjoining the instant picture elements, which are read out of the memory 5d, and the difference quantized value. The memory 5d corresponds to that 5b of the transmitting side and, by using the control signal 1201, selects from the restored values $X_{11}$ and $X_{13}$ the instant picture element value 507 selected on the transmitting side, which picture element value is provided as an output signal of the decoding device of the receiving side and, at the same time, stored in a memory for the production of the predictive value in the subsequent decoding operation.

The above is the receiving side used for receiving information transmitted in accordance with this invention. No description will be given of their construction since they are obrious in construction from the corresponding blocks of the transmitting side.

The foregoing has described the adaptive predictive coding system for a television signal according to this invention which for predicting a picture element of a certain field, comprises an intra-field predictive coder which, produces a predictive value by using picture element values of the same field as the picture element and employs the predictive value as a restored value in place of a true picture element value; an intra-field difference quantizing coder which produces a predictive value from picture element values of the same field and quantizes a difference between the predictive value and a true picture element value and then transmit the quantized value to the receiving side; an inter-field predictive coder which produces a predictive value by using picture element values of not only the same field but also an immediately preceding field; and an inter-field predictive coder and an interfield difference quantizing coder in which eight picture elements form one block and an optimum one of the coding parts is selected for each block.

The above has further described other examples of this invention, i.e. the adaptive coding system which selects the predictive coding system by employing the true picture element value and the adaptive coding system which indicates, by one bit for each picture element, whether the coding selected is the intra-field or inter-field predictive coding and whether the difference quantization is selected or not. This invention is also applicable to monochrome picture signals.

What we claim is:

1. An adaptive predictive television signal coding system comprising: a memory having a capacity capable of storing an input television signal of at least one field and one picture element at all times; an intra-field difference quantizing coder which, when supplied with a value $X_1$ of the latest input picture element of the television signal, reads out from the memory a picture element value in the same field as the input signal to produce a predictive value $\overline{X_{12}}$ of the latest input picture element and quantizes a difference between the predictive value and the latest picture element value to produce a difference quantized value $Z_{12}$ and provides a decoded value $X_{12}$ of the latest picture element as $X_{12}=\overline{X_{12}}+Z_{12}$; an inter-field difference quantizing coder which, then supplied with the value $X_1$ of the latest picture element, reads out from the memory picture element values in the same field as the input signal and a field immediately preceding it to produce a predictive value $\overline{X_{14}}$ of the latest input picture element and quantizes a difference between the predictive value and the latest picture element to produce a difference quantized value $Z_{14}$ and provides a decoded value $X_{14}$ of the latest picture element as $X_{14}=\overline{X_{14}}+Z_{14}$; an adaptive predictive coding control part which compares differences between the decoded values $X_{12}$ and $X_{14}$ of the both coders and the true picture element value $X_1$ and selects the coder of a smaller error for using it as a coder for predicting the latest picture element; and a transmission signal coder which converts to transmission signals a mode indicating signal indicating the selected one of the two coders, the difference quantized values $Z_{12}$ or $Z_{14}$ derived therefrom and mode indicating information.

2. An adaptive predictive television signal coding system comprising: a memory having a capacity capable of storing an input television signal of at least one field and one picture element at all times; an intra-field predictive coder which, when supplied with a value $X_1$ of the latest input picture element of the television signal, reads out from the memory a picture element value in the same field as the input signal to produce a predictive value $\overline{X_{11}}$ of the latest input picture element and provides the predictive value as a decoded value $X_{11}$ of the latest picture element value $X_1$; an intra-field difference quantizing coder which, when supplied with the value $X_1$ of the latest picture element, reads out from the memory a picture element value in the same field as the input signal to produce a predictive value $\overline{X_{12}}$ of the latest input picture element and quantizes a difference between the predictive value and the latest picture element value to produce a difference quantized value $Z_{12}$ and provides a decoded value $X_{12}$ of the latest picture element as $X_{12}=\overline{X_{12}}+Z_{12}$; an inter-field predictive coder which, when supplied with the value $X_1$ of the latest picture element, reads out from the memory picture element values in the same field as the input signal and in a field immediately preceding it to produce a predictive value $\overline{X_{13}}$ of the latest input picture element and provides the predictive value as a decoded value $X_{13}$ of the latest picture element value $X_1$; an inter-field difference quantizing coder which, when supplied with the value $X_1$ of the latest picture element, reads out from the memory picture element values in the same field as the input signal and a field immediately preceding it to produce a predictive value $\overline{X_{14}}$ of the latest input picture element and quantizes a difference between the predictive value and the latest picture element value to produce a difference quantized value $Z_{14}$ and provides a decoded value $\overline{X_{14}}$ of the latest picture element as $X_{14} = \overline{X_{14}} + Z_{14}$; an adaptive predictive coding control part which compares errors in magnitude between the decoded values $X_{11}$ and $X_{13}$ of the intra-field predictive coder and the inter-field predictive coder and the true picture element value $X_1$ and, if the error value of the predictive coder of a smaller error value is smaller than a predetermined threshold value $T_H$, selects the predictive coder for coding the latest picture element and, if the error value of the predictive coder is larger than the threshold value $T_H$, compares again the errors in magnitude between the decodes values $X_{12}$ and $X_{14}$ of the intra-field and inter-field predictive coders and the picture element $X_1$ and selects the predictive coder of a smaller error value for coding the latest picture element, thereby to select one of the four coders for coding the latest picture element; and a coding device of the transmitting side including a transmission signal coder which converts to transmission signals a mode indicating signal indicating the selected one of the four coders and the difference quantized value $Z_{12}$ or $Z_{14}$ in dependence upon whether the intra-field or inter-field difference quantizing coder, and a buffer control part which stores in a buffer memory the mode indicating signal and the transmission signal coded by the transmission signal coding part and provides them on the transmission line at a constant rate and, at the same time, changes the threshold value $T_H$ for selecting the predictive coder or difference quantizing coder in accordance with the amount of data stored in the buffer memory.

* * * * *